(12) United States Patent
Ochiai et al.

(10) Patent No.: US 11,797,321 B2
(45) Date of Patent: Oct. 24, 2023

(54) INFORMATION GENERATION APPARATUS AND CONTROL SYSTEM

(71) Applicant: NTT DOCOMO, INC., Chiyoda-ku (JP)

(72) Inventors: Keiichi Ochiai, Chiyoda-ku (JP); Naoki Yamamoto, Chiyoda-ku (JP); Takashi Hamatani, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 101 days.

(21) Appl. No.: 17/437,962

(22) PCT Filed: Jan. 29, 2020

(86) PCT No.: PCT/JP2020/003059
§ 371 (c)(1),
(2) Date: Sep. 10, 2021

(87) PCT Pub. No.: WO2020/189030
PCT Pub. Date: Sep. 24, 2020

(65) Prior Publication Data
US 2022/0179669 A1    Jun. 9, 2022

(30) Foreign Application Priority Data
Mar. 20, 2019   (JP) ................................. 2019-053161

(51) Int. Cl.
*G06F 9/451*     (2018.01)
*G06F 3/14*      (2006.01)

(52) U.S. Cl.
CPC ................ *G06F 9/453* (2018.02); *G06F 3/14* (2013.01)

(58) Field of Classification Search
CPC .................................................. G06F 16/9535
See application file for complete search history.

(56) References Cited

U.S. PATENT DOCUMENTS

2015/0286487 A1* 10/2015 Glass ...................... G06F 9/453
                                                                715/707
2017/0169520 A1*  6/2017 Cornet ................. G06Q 40/125
(Continued)

FOREIGN PATENT DOCUMENTS

JP           2016-57854 A       4/2016

OTHER PUBLICATIONS

International Search Report dated Apr. 14, 2020 in PCT/JP2020/003059 filed on Jan. 29, 2020 (2 pages).

*Primary Examiner* — Di Xiao
(74) *Attorney, Agent, or Firm* — Oblon, McClelland, Maier & Neustadt, L.L.P.

(57) ABSTRACT

A server includes a first statistic processor configured to calculate, for each of different types of screens displayed on a display; a first statistic value of display time of a screen of each type display on the display, to generate first statistic values corresponding to the different types of screens; a first determiner configured to determine, for each type of the screens, whether a user is concentrating on a screen of each type, based on, from among the first statistic values, a first statistic value calculated for the screen of each type; and a generator configured to generate a list including screen identification information for identifying, from among the different types of screens, a type of screen for which a corresponding determination result from the first determiner is affirmative.

10 Claims, 16 Drawing Sheets

(56) References Cited

U.S. PATENT DOCUMENTS

| | | | | |
|---|---|---|---|---|
| 2017/0364274 | A1* | 12/2017 | Hammons | G06F 11/1446 |
| 2018/0284959 | A1* | 10/2018 | Alphin, III | G06Q 10/109 |
| 2018/0285130 | A1* | 10/2018 | Chakra | G06F 9/453 |
| 2019/0317643 | A1* | 10/2019 | Bhardwaj | G06F 3/167 |
| 2020/0142552 | A1* | 5/2020 | Borkar | G06F 3/0483 |
| 2022/0147840 | A1* | 5/2022 | Zotto | G06N 5/022 |

* cited by examiner

FIG. 3A

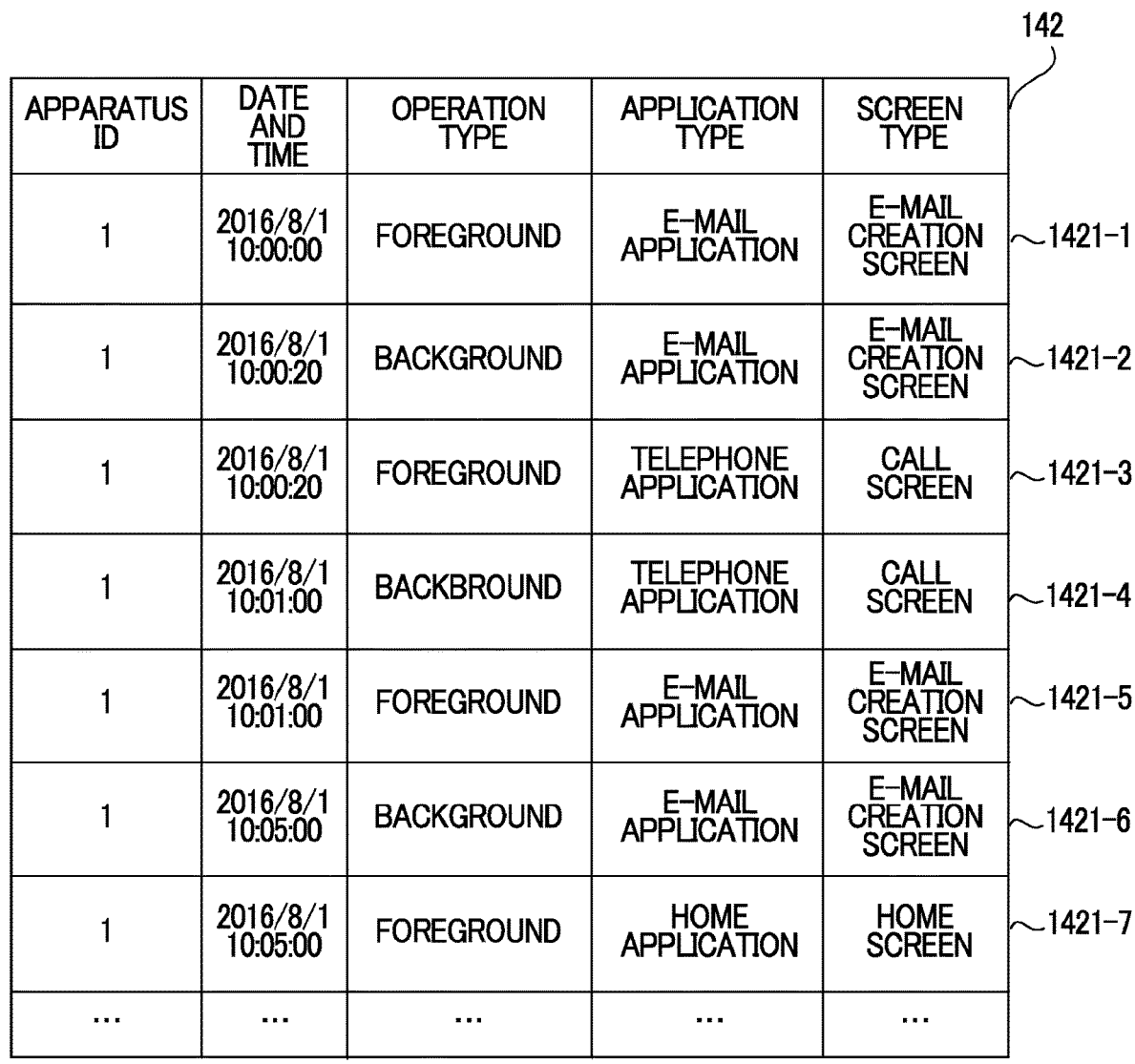

| APPARATUS ID | DATE AND TIME | OPERATION TYPE | APPLICATION TYPE | SCREEN TYPE | |
|---|---|---|---|---|---|
| 1 | 2016/8/1 10:00:00 | FOREGROUND | E-MAIL APPLICATION | E-MAIL CREATION SCREEN | 1421-1 |
| 1 | 2016/8/1 10:00:20 | BACKGROUND | E-MAIL APPLICATION | E-MAIL CREATION SCREEN | 1421-2 |
| 1 | 2016/8/1 10:00:20 | FOREGROUND | TELEPHONE APPLICATION | CALL SCREEN | 1421-3 |
| 1 | 2016/8/1 10:01:00 | BACKBROUND | TELEPHONE APPLICATION | CALL SCREEN | 1421-4 |
| 1 | 2016/8/1 10:01:00 | FOREGROUND | E-MAIL APPLICATION | E-MAIL CREATION SCREEN | 1421-5 |
| 1 | 2016/8/1 10:05:00 | BACKGROUND | E-MAIL APPLICATION | E-MAIL CREATION SCREEN | 1421-6 |
| 1 | 2016/8/1 10:05:00 | FOREGROUND | HOME APPLICATION | HOME SCREEN | 1421-7 |
| ... | ... | ... | ... | ... | |

FIG. 3B

| APPARATUS ID | DATE AND TIME | OPERATION TYPE | APPLICATION TYPE | SCREEN TYPE | |
|---|---|---|---|---|---|
| ... | ... | ... | ... | ... | |
| 1 | 2016/8/1 10:58:00 | BACKGROUND | HOME APPLICATION | HOME SCREEN | ~1421-8 |
| 1 | 2016/8/1 10:58:00 | FOREGROUND | TELEPHONE APPLICATION | DIAL PAD SCREEN | ~1421-9 |
| ... | ... | ... | ... | ... | |
| m | 2016/8/1 10:00:00 | FOREGROUND | VIDEO PLAYBACK APPLICATION | VIDEO PLAYBACK SCREEN | ~1421-10 |
| ... | ... | ... | ... | ... | |
| m | 2016/8/1 10:59:00 | BACKBROUND | HOME APPLICATION | HOME SCREEN | ~1421-11 |
| m | 2016/8/1 10:59:00 | FOREGROUND | MUSIC PLAYBACK APPLICATION | MUSIC PLAYBACK SCREEN | ~1421-12 |

| APPLICATION NAME | SCREEN NAME |
|---|---|
| E-MAIL APPLICATION | E-MAIL CREATION SCREEN |

HINT ABOUT DIAL PAD SCREEN
...

| SCREEN TYPE | 10:00:00 – 11:00:00 | 11:00:00 – 12:00:00 | AVERAGE |
|---|---|---|---|
| A | 2 | 4 | 3 |
| B | 2 | – | 2 |
| C | – | 4 | 4 |
| D | – | 4 | 4 |
| E | – | 4 | 4 |

| SCREEN TYPE | 10:00:00 – 11:00:00 | 11:00:00 – 12:00:00 | AVERAGE |
|---|---|---|---|
| A | 600 | 200 | 400 |
| B | 600 | – | 600 |
| C | – | 200 | 200 |
| D | – | 200 | 200 |
| E | – | 200 | 200 |

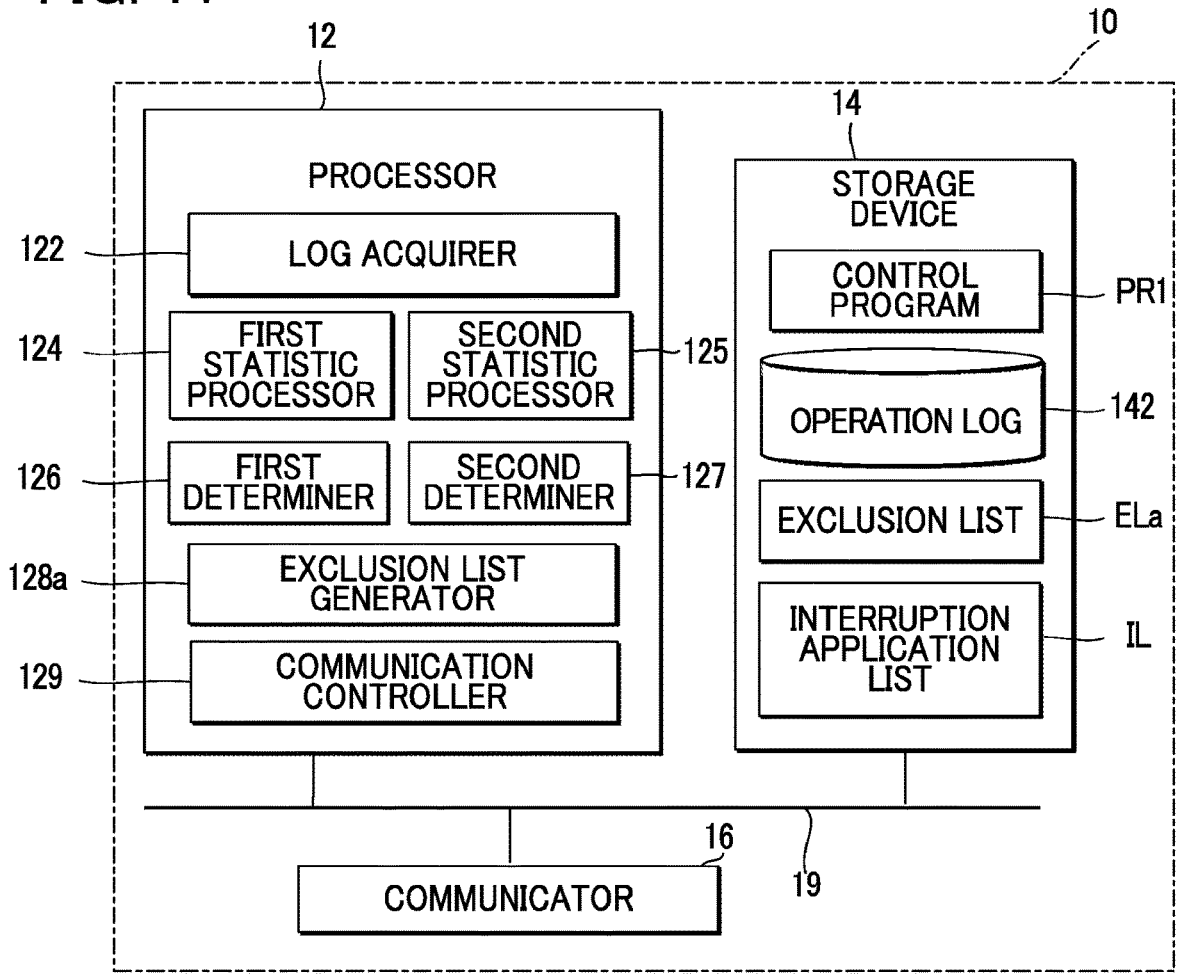

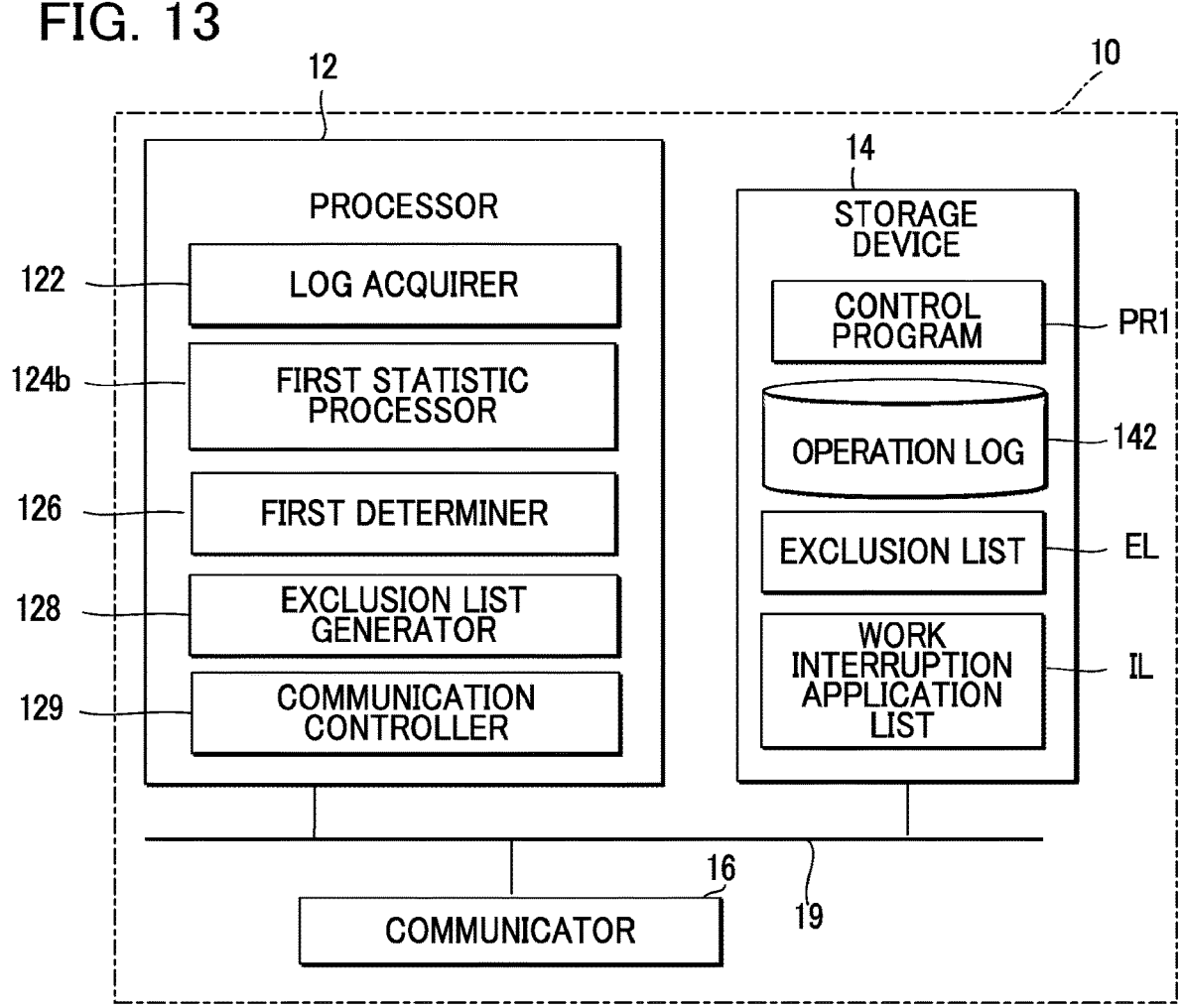

INFORMATION GENERATION APPARATUS AND CONTROL SYSTEM

TECHNICAL FIELD

The present invention relates to an information generation device and to a control system therefor.

BACKGROUND ART

Services have become common that provide assistance information to assist a user in an operation on the basis of the operation history of the user on a user apparatus. Operations performed by a user include an input operation performed by a user for entering a character string in a field on the screen shown on the display, and a selection operation performed by a user for selecting any one of the fields on the screen. For example, Patent Document 1 describes a system that provides assistance information on how to perform an operation when the system determines, based on a result of analyzing the pattern of operations performed by a user, that the user is uncertain what to do.

RELATED ART DOCUMENT

Patent Document

Patent Document 1: Japanese Patent Application Laid-Open Publication No. 2016-57854

SUMMARY OF THE INVENTION

Problem to be Solved by the Invention

However, the aforementioned conventional technique has a drawback in that a user's concentration is interrupted when assistance information is provided in a situation in which the user is concentrating on the screen.

Means of Solving the Problems

In order to solve the above problem, an information generation apparatus according to a preferred mode of the present invention includes: a first statistic processor configured to calculate, for each of different types of screens displayed on a display, a first statistic value of display time of a screen of each type displayed on the display, to generate first statistic values corresponding to the different types of screens; a first determiner configured to determine, for each type of screen, whether a user is concentrating on a screen of each type, based on, from among the first statistic values, a first statistic value calculated for the screen of each type; and a generator configured to generate a list including screen identification information for identifying, from among the different types of screens, a type of screen for which a corresponding determination result from the first determiner is affirmative.

In order to solve the aforementioned problem, a control system according to a preferred mode of the present invention includes the information generation apparatus and information processing apparatuses each including a display and configured to communicate with the information generation apparatus. The information processing apparatuses each include: an acquirer configured to acquire the list from the information generation apparatus; a decider configured to determine not to provide the user with assistance information for assisting the user in an operation when the list includes screen identification information indicating a type of screen displayed on the display, and to determine to provide the user with the assistance information in accordance with a status of the operation when the list includes screen identification information indicating a type of screen displayed on the display; and a display controller configured to cause the display to display an image based on the assistance information when the decider determines to provide the user with the assistance information.

Effects of the Invention

The present invention reduces the provision of assistance information when the user is concentrating on the screen.

BRIEF DESCRIPTION OF THE DRAWINGS

FIG. 3A is a diagram showing an example part of stored contents of an operation log 142.
FIG. 3B is a diagram continued from FIG. 3A.
FIG. 4 is a diagram showing an example content stored in an exclusion list EL.
FIG. 5 is a diagram showing an example content stored in assistance information HI.
FIG. 11 is a diagram illustrating the configuration of a server 10 according to a second embodiment.
FIG. 12 is a diagram showing an example content stored in an exclusion list ELa.
FIG. 13 is a diagram illustrating the configuration of the server 10 according to a third embodiment.

MODES FOR CARRYING OUT THE INVENTION

1. First Embodiment

Figure 1:
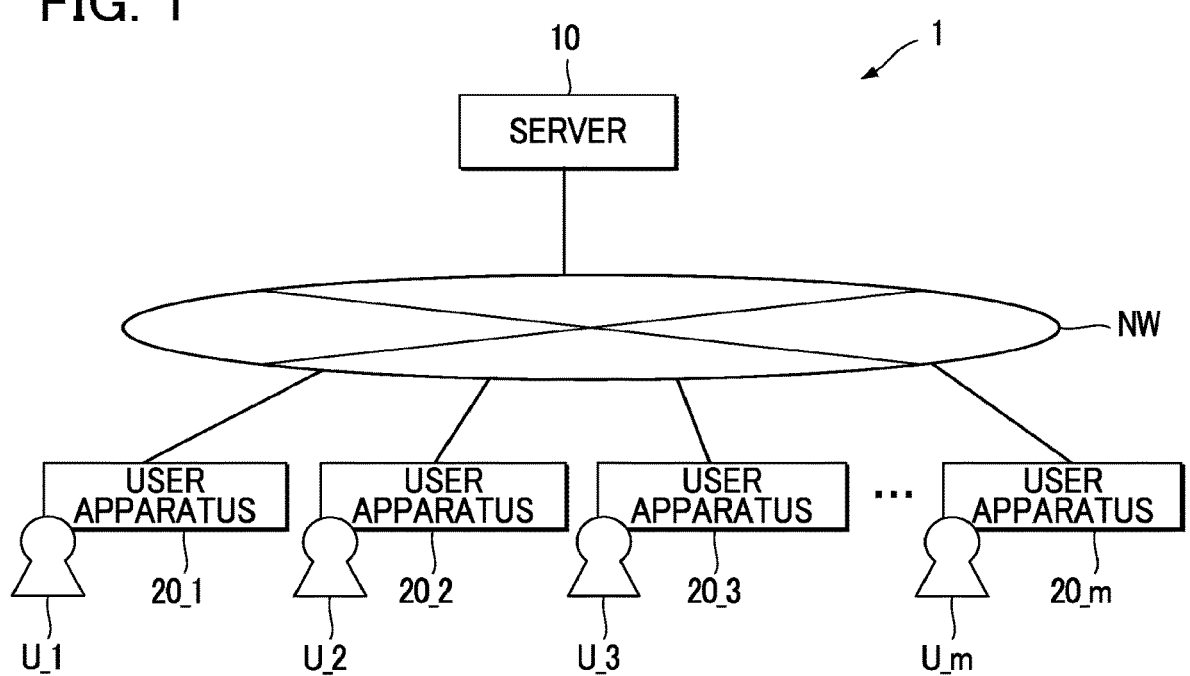
FIG. 1 is a block diagram showing the overall configuration of a control system 1 according to a first embodiment of the present invention.

FIG. 1 is a block diagram showing the overall configuration of a control system 1 according to a first embodiment of the present invention. As shown in FIG. 1, the control system 1 includes a server 10, user apparatuses 20_1 to 20_m (m is an integer of 2 or more) possessed by users U_1 to U_m, respectively, and a network NW. The server 10 is an example of an "information generation apparatus". The user apparatus 20 is an example of an "information processing apparatus".

In the following description, reference numerals such as user apparatus 20_1, user apparatus 20_2, user U_1, and user U_2 are used to distinguish elements of the same type. In contrast, when it is not necessary to distinguish elements of the same type, that is, in order to indicate a freely chosen element, user apparatus 20, user U, or the like, from which the appended specifying number is omitted, is used.

The server 10 controls whether to provide the user U with assistance information to assist the user U in an operation when application software in the user apparatus 20 is executed. The application is an example of a "software program". The application may be referred to as, for example, a "package" depending on the Operating System (OS) on which the application operates. Similarly, a screen managed by the application may be referred to as an "activity".

The assistance information is, for example, information that is helpful when the user U is uncertain what to do about how to operate the application. Specifically, the assistance information is character information or image data indicating specific description of the operation method.

The user apparatus 20 is, for example, a portable terminal device such as a smartphone or a tablet terminal device. Alternatively, the user apparatus 20 may be any information processing apparatus, for example, a terminal type information device such as a personal computer.

Figure 2:
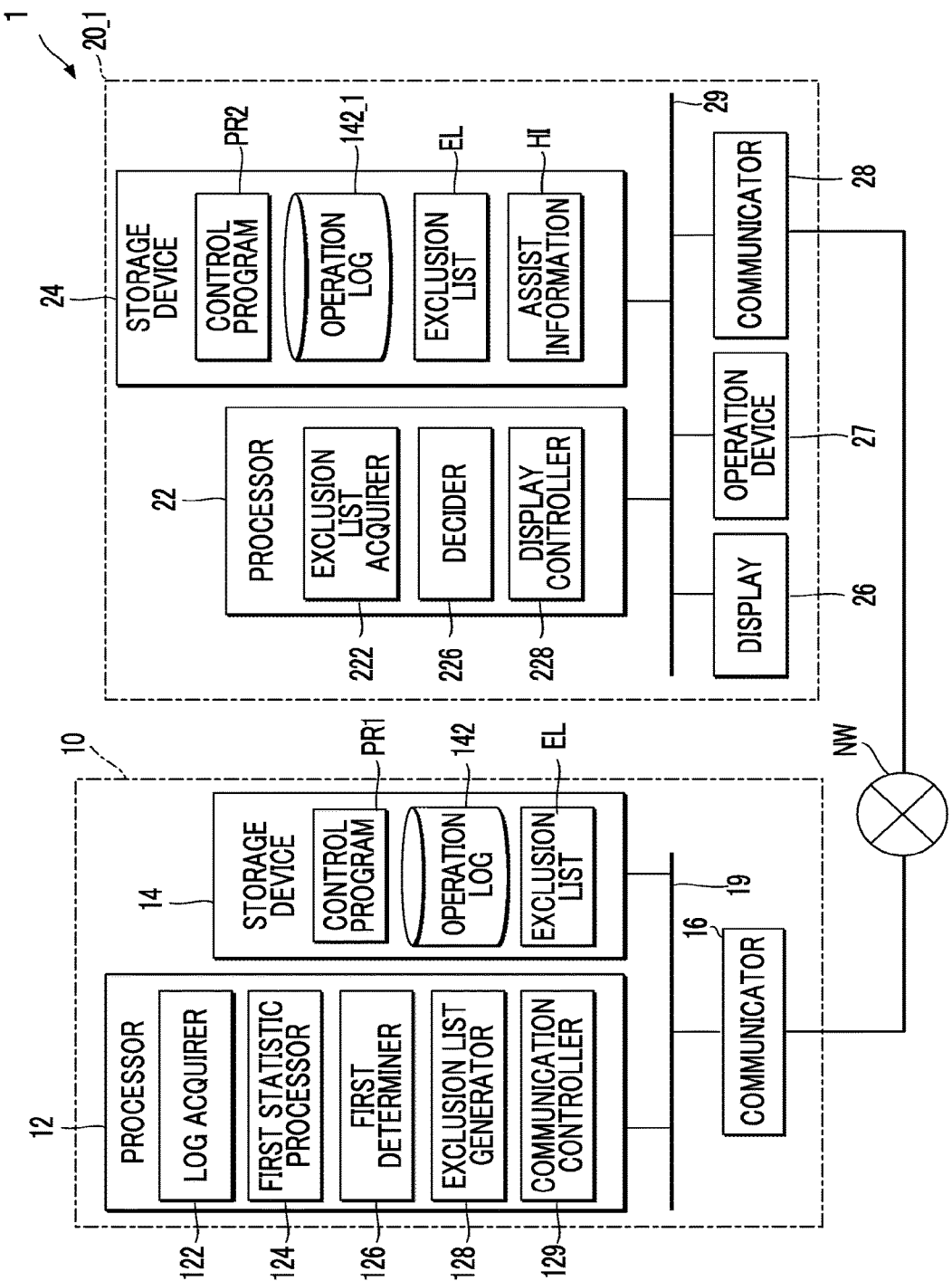
FIG. 2 is a diagram illustrating the configuration of the control system 1.

FIG. 2 is a diagram illustrating the configuration of the control system 1. In FIG. 2, the user apparatus 20_1 of the user apparatuses 20_1 to 20_*m* is shown as an example. The server 10 includes a processor 12, a storage device 14, and a communicator 16. The processor 12, the storage device 14, and the communicator 16 are mutually accessible through buses 19 for information communication. The buses 19 may be a single bus. Different buses may be used for different devices.

The processor 12 is a processor that controls the entire server 10, and it is composed of, for example, a single chip or a plurality of chips. The processor 12 is composed of, for example, a Central Processing Unit (CPU) including an interface with peripheral devices, an arithmetic unit, and a register. Note that some or all of the functions of the processor 12 may be implemented by hardware, such as by a Digital Signal Processor (DSP), Application Specific Integrated Circuit (ASIC), Programmable Logic Device (PLD), or Field Programmable Gate Array (FPGA). The processor 12 executes various processes in parallel or sequentially.

The storage device 14 is a recording medium that can be read by the processor 12, and it stores programs including a control program PR1 to be executed by the processor 12, various data to be used by the processor 12, an operation log 142, and exclusion list EL generated by the processor 12 in the first embodiment. The storage device 14 is composed of one or more types of memory circuits, such as Read-Only Memory (ROM), Erasable Programmable ROM (EPROM), Electrically Erasable Programmable ROM (EEPROM), and Random Access Memory (RAM).

FIG. 3A is a diagram showing an example part of stored contents of an operation log 142. FIG. 3B is a diagram continued from FIG. 3A. Specifically, FIG. 3B is a diagram showing an example of the remaining content stored in the operation log 142 not shown in FIG. 3A. The operation log 142 indicates the display time of each of the screens of the user apparatuses 20_1 to 20_*m* in a predetermined period, for example, one hour. The operation log 142 shown in FIGS. 3A and 3B has records 1421-1 to 1421-12. The operation log 142 shown in FIGS. 3A and 3B is information including a record (set) in which an apparatus ID (identifier), date and time, operation type, application type (application name), and screen type (screen name) are associated with each other for each operation that has occurred.

A terminal ID is identification information for identifying the user apparatus 20, which has been operated, from among the user apparatuses 20_1 to 20_*m*. The identification information is, for example, a user identifier (UID), a media access control (MAC) address, an international mobile subscriber identity (IMSI) recorded in a subscriber identity module (SIM), or a user ID. The UID is an ID assigned to each user by a service provider. In the first embodiment, to simplify description, the terminal ID is indicated using the subscript of the user apparatus 20.

Date and time indicate the date and time when an operation occurs. An operation type indicates the type of the operation that has occurred. Operation types include foreground and background. Screen display time is a period of time from the date and time when the foreground occurs to the date and time when the background occurs. An application name is the name of an application that has been operated. A screen name is the name of a screen. A screen name and a screen correspond to each other.

In the aforementioned OS, even different applications may be given the same application name. In addition, a package name is an identifier for uniquely identifying the application. For this reason, a package name is an example of "software identification information for identifying software". However, for ease of explanation, suppose that, in the following description, different applications have different application names. Suppose also that an identifier for uniquely identifying an application is an application name. A screen name is an example of "screen identification information for identifying a type of screen". In the following description, a type of screen is simply referred to as "screen name".

The operation logs 142 shown in FIGS. 3A and 3B show six screen names: 1) an e-mail creation screen managed by an e-mail application, 2) a call screen 3) and a dial pad screen managed by a telephone application, 4) a home screen managed by a home application, 5) a video playback screen managed by a video playback application, and 6) a music playback screen managed by a music playback application.

FIG. 4 is a diagram showing an example of content stored in an exclusion list EL. The exclusion list EL indicates a name of a screen, the assistance information HI of which is not provided to the user U. The exclusion list EL shown in FIG. 4 is data in which an application name and a screen name associated with each other are recorded. The exclusion list EL shown in FIG. 4 has a record EL1-1. The example of the record EL-1 shows that the assistance information HI is not provided to the user U on an e-mail creation screen managed by an e-mail application.

Description will now be given returning to FIG. 2. The communicator 16 is a device that communicates with other devices via a network NW such as a mobile communication network or the Internet. The communicator 16 is also denoted as, for example, a network device, a network controller, a network card, or a communication module. The communicator 16 can communicate with, for example, the user apparatus 20 via the network NW.

The user apparatus 20 includes a processor 22, a storage device 24, a display 26, an operation device 27, and a communicator 28. The processor 22, the storage device 24, the display 26, the operation device 27, and the communicator 28 are mutually accessible through one or more buses 29 for information communication. The buses 29 may be a single bus. Different buses may be used for different devices.

The processor 22 is a processor that controls the entire user apparatus 20, and it is composed of, for example, a single chip or a plurality of chips. The processor 22 is composed of, for example, a central processing unit including an interface with peripheral devices, an arithmetic unit, and a register. Note that some or all of the functions of the processor 22 may be implemented by hardware such as DSP, ASIC, PLD, and FPGA. The processor 22 executes various processes in parallel or sequentially.

The storage device 24 is a recording medium that can be read by the processor 22. The storage device 24 stores programs including a control program PR2 executed by the processor 22, the operation log 142_1, the exclusion list EL, and various data used by the processor 22. The storage device 24 is composed of one or more storage circuits such as ROM, EPROM, EEPROM, and RAM.

The operation log 142_1 shows the display time of the screen on the user apparatus 20_1. This screen is displayed on the display 26 through a program module. The program module is a part of the programs stored in the storage device 24. A program module has cohesive functions. A program module that causes the display 26 to display a screen may be referred to as an "activity class", for example.

When the operation logs 142 shown in FIGS. 3A and 3B are used, the operation log 142_1 stores records having the same contents as the records 1421-1 to 1421-9. The exclusion list EL is information received from the server 10. The assistance information HI is information for assisting the user U in performing an operation, and is provided in accordance with the status of the operation of the user U.

FIG. 5 is a diagram showing an example of the content stored in assistance information HI. The assistance information HI shown in FIG. 5 indicates suggestions about how to operate the dial pad screen managed by the telephone application.

Description will now be given returning to FIG. 2. The display 26 shows various images under the control by the processor 22. For example, various display panels such as liquid crystal display panels and organic electro luminescence (EL) display panels are preferably used as the display 26.

The operation device 27 is a device for receiving information to be used by the user apparatus 20. The operation device 27 receives user's operations. Specifically, the operation device 27 receives an operation for inputting a code (for example, a number or a character) and an operation for selecting an icon to be displayed on the display 26. For example, a touch screen that detects a touch of the finger of the user on the display surface of the display 26 is suitable as the operation device 27. In the following description, the operation device 27 is assumed to be a touch screen. The operation device 27 may include an implement that can be operated by the user. The implement may be a touch stylus (pen), for example.

The communicator 28 is a device that communicates with other devices via a network NW such as a mobile communication network or the Internet. The communicator 28 is also denoted as, for example, a network device, a network controller, a network card, or a communication module. The communicator 28 can communicate with, for example, the server 10 via the network NW.

1.1. Functions of First Embodiment

The processor 12 reads the control program PR1 from the storage device 14 and executes the control program PR1, thereby functioning as a log acquirer 122, a first statistic processor 124, the first determiner 126, the exclusion list generator 128, and a communication controller 129. Similarly, the processor 22 executes the control program PR2 from the storage device 24, thereby functioning as an exclusion list acquirer 222, a decider 226, and a display controller 228. Note that the exclusion list generator 128 is an example of a "generator". The exclusion list acquirer 222 is an example of an "acquirer".

The functions implemented by the processor 12 and the processor 22 will now be described with reference to FIG. 6.

Figure 6:
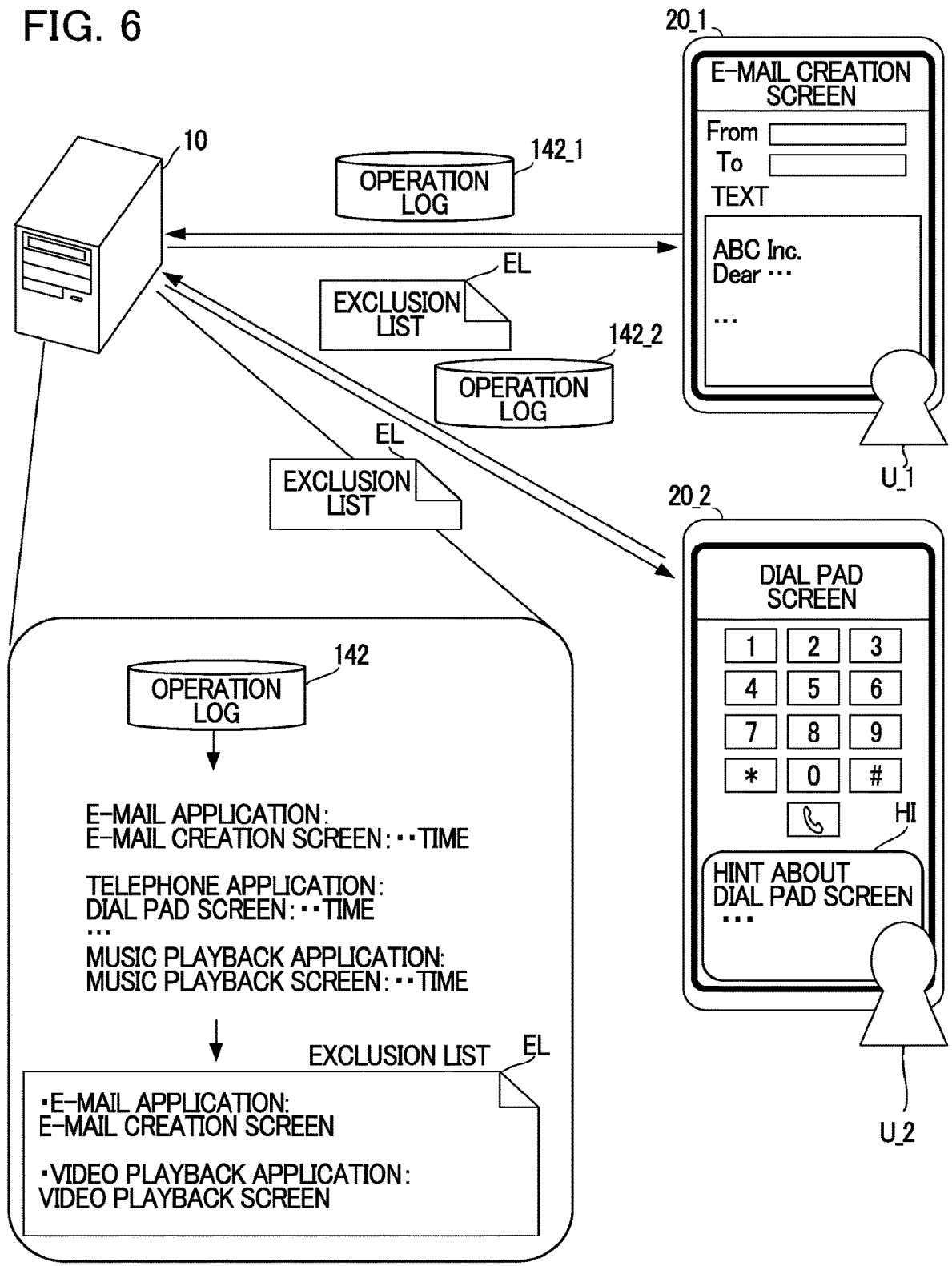
FIG. 6 is a diagram showing an outline of the functions of the control system 1.

FIG. 6 is a diagram showing the outline of the functions of the control system 1. In FIG. 6, to simplify the drawing, of the user apparatuses 20_1 to 20_m, the user apparatus 20_1 and the user apparatus 20_2 are shown as examples.

The log acquirer 122 acquires the operation log 142 from each of the user apparatuses 20_1 to 20_m. In the example shown in FIG. 6, the log acquirer 122 acquires the operation log 142_1 from the user apparatus 20_1 and acquires the operation log 142_2 from the user apparatus 20_2.

The first statistic processor 124 calculates the statistic value of the display time of a screen for each screen name on the basis of the operation log 142. The statistic value of the display time is a numerical value that summarizes the characteristics of the display time of the screen. The statistic value of the display time is, for example, an average, a median, or a value obtained by adding a value that is twice the standard deviation to the average. The first statistic processor 124 calculates the average of the display time using the display time of the screen, for example. When the same screen is displayed at different times, the first statistic processor 124 may determine the median of the display time by comparing the length of the display time of the screen at a certain time with the length of the display time of the screen at a different time. In the following description, suppose that the statistic value of the display time is the average of the display time.

In the example shown in FIG. 6, the first statistic processor 124 calculates, for example, the average of the display time of the e-mail creation screen managed by the e-mail application, the average of the display time of the call screen managed by the telephone application, and the average of the display time of the music playback screen managed by the music playback application.

The first determiner 126 determines whether the user U is concentrating on each screen for each screen name on the basis of the average of the display time calculated for each screen name. The first determiner 126 can take any of the following six modes.

In the first mode of the first determiner 126, the first determiner 126 determines that the screen name, for which the average of the display time exceeds a predetermined value, is the screen name of the screen on which the user U is concentrating. The predetermined value has, for example, the following two modes. The first mode of the predetermined value is a fixed value. The second mode of the predetermined value is a value determined based on the average of the display time of multiple screens. The average of the display time of the screens is, for example, the average of the display time of all screens. Screens not to be used to determine the predetermined value may be determined in advance.

In the second mode of the first determiner 126, the first determiner 126 determines that a predetermined number of screen names with the highest display time averages are the screen names of the screens on which the user is concentrating.

In the third mode of the first determiner 126, the first statistic processor 124 determines, for each screen name, the statistic value of the number of types of applications activated within a unit period including the time when the screen was displayed. The statistic value of the number of types of activated applications is the average or the median of the number of types of activated applications. In the following description, suppose that the statistic value of the number of types of activated applications is the average number of types of activated applications. Specifically, the unit period including the time when the screen was displayed is a period of time including any point of time in the period from the start time to the end time when the screen is displayed. The unit period may have any length, for example, 10 minutes or 1 hour.

Figure 7:
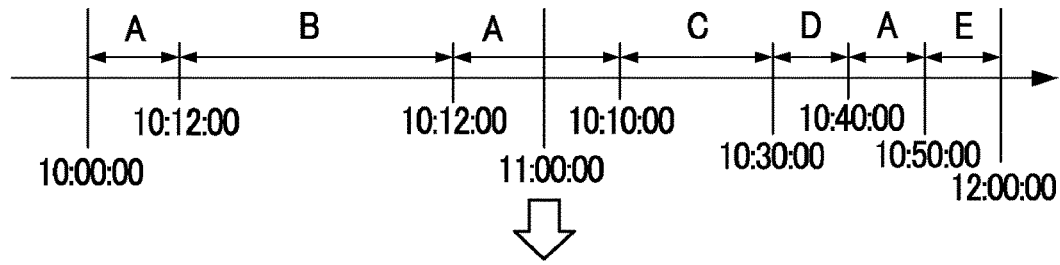
FIG. 7 is a diagram showing an example of specifying the average number of types of applications.

FIG. 7 is a diagram showing an example of specifying the average number of types of applications. The example shown in FIG. 7 shows the display time of the screen of a user apparatus 20 for a unit period 1 from 10:00:00 to 11:00:00 and a unit period 2 from 11:00:00 to 12:00:00. In FIG. 7, suppose that the user apparatus 20 displays a screen A, a screen B, a screen C, a screen D, and a screen E as screen names in the period from 10:00:00 to 12:00:00. To simplify explanation, suppose that the screen A, the screen B, the screen C, the screen D, and the screen E are managed by different applications. Suppose also that the applications that manage the respective screens are activated when the screen A, the screen B, the screen C, the screen D, and the screen E are displayed.

In the unit period 1, the user apparatus 20 displays the screen A and the screen B, and in the unit period 2, the user apparatus 20 displays the screen A, the screen C, the screen D, and the screen E. The first statistic processor 124 calculates the number of types of activated applications to be 2 in the unit period 1 including the time when the screen A and the screen B are displayed. Similarly, the first statistic processor 124 calculates the number of types of activated applications to be 4 in the unit period 2 including the time when the screen A, the screen C, the screen D, and the screen E are displayed. Since the screen A has been displayed in the unit periods 1 and 2, the number of types of activated applications in the unit period 1 is 2, and the number of types of activated application in the unit period 2 is 4. Therefore, the first statistic processor 124 calculates the average number of types of activated applications to be 3. Similarly, since the screen B has been displayed only in the unit period 1, the number of types of activated applications in the unit period 1 is 2. Accordingly, the first statistic processor 124 calculates the average number of types of activated applications to be 2. Similarly, for the screens C, D, and E, the number of types of activated applications in the unit period 2 is 4, so that the first statistic processor 124 calculates the average number of types of activated applications to be 4.

Description will now be given returning to FIG. 2. In the third mode of the first determiner 126, the first determiner 126 determines, for each screen name, whether the user U is concentrating on the screen, based on the average of the display time of each screen name and the number of types of applications activated for each screen name. The following two determination methods can be given as examples. In the first method, when the average of the display time exceeds a predetermined value and the average number of types of activated applications is less than a predetermined value, the first determiner 126 determines the screen name as that of the screen on which the user is concentrating. In the second method, the first determiner 126 determines that, of a predetermined number of screen names with the largest display time averages, the type of screen for which the average number of types of activated applications is less than a predetermined value is the type of screen on which the user is concentrating.

In the fourth mode of the first determiner 126, the first statistic processor 124 determines, for each screen name, the statistic value of the number of times the user U has operated within a unit period including the display time of the screen. The number of operations by the user U is, for example, the number of times the user U taps the touch screen and the number of times the user U flicks the touch screen. The statistic value of the number of operations is, for example, the average or median of the number of operations. In the following description, the statistic value of the number of operations is described as the average of the number of operations.

Figure 8:
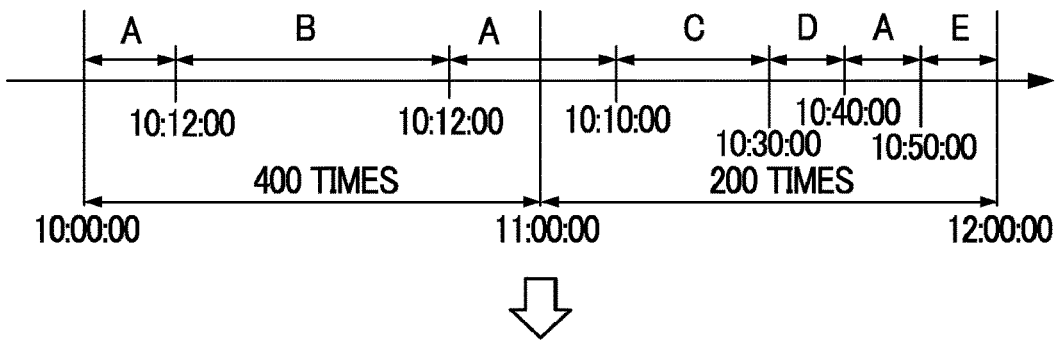
FIG. 8 is a diagram showing an example of specifying the statistic value of the number of operations.

FIG. 8 is a diagram showing an example of specifying the statistic value of the number of operations. In the example shown in FIG. 8, the number of operations in the unit period 1 and the number of operations in the unit period 2 in the example shown in FIG. 7 are shown. In the unit period 1, the number of operations by the user U is 600, and in the unit period 2, the number of operations by the user U is 200. In addition, the statistic value of the number of operations is set as the average number of types of activated applications.

Since the number of operations in the unit period 1 is 600 and the number of operations in the unit period 2 is 200 for the screen A, the first statistic processor 124 calculates the average of the numbers of operations to be 400. Similarly, since the number of operations in the unit period 1 is 600 for the screen B, the first statistic processor 124 calculates the average of the numbers of operations to be 600. Similarly, since the number of operations in the unit period 2 is 200 for the screens C, D, and E, the first statistic processor 124 calculates the average of the numbers of operations to be 200.

Description will now be given returning to FIG. 2. In the fourth mode of the first determiner 126, the first determiner 126 determines, for each screen name, whether the user U is concentrating on the screen, based on the average of the display time of each screen name and the number of operations for each screen name. The following two determination methods can be given as examples. In the first method, when the display time average exceeds a predetermined value and when the number of operations is a predetermined value or more, the first determiner 126 determines that the screen has the screen name of the screen on which the user is concentrating. In the second method, the first determiner 126 determines that, among a predetermined number of screen names with the largest display time averages, the screen name for which the number of operations of a predetermined value or more is the screen name of the screen on which the user is concentrating.

In the fifth mode of the first determiner 126, the first determiner 126 calculates, for each screen name, the statistic value of the number of times the video library or still image library is accessed within a unit period including the time when the screen was displayed. The video library is a library in which video information encoded in, for example, the Moving Picture Experts Group (MPEG) format is decoded. The still image library is a library in which still image information encoded in, for example, Joint Photographic Experts Group (JPEG), graphics interchange format (GIF), or portable network graphics (PNG) format is decoded. For example, upon reception of encoded video information, the application accesses the video library to obtain the decoded video information.

Subsequently, the first determiner 126 determines, for each screen name, whether the user is concentrating on the screen, based on both the display time statistic value for each screen name and the statistic value of the number of times the video library or still image library is accessed for each screen name. The following two determination methods can be given as examples. In the first method, when the display time average exceeds a predetermined value and the number of call times is a predetermined value or more, the first determiner 126 determines that the screen name is that of the screen on which the user is concentrating. In the second method, the first determiner 126 determines that, among a predetermined number of screen names with the largest display time averages, the screen name for which the number of calls is a predetermined value or more is the screen name of the screen on which the user is concentrating.

The sixth mode of the first determiner 126 is a combination of the first to fifth modes of the first determiner 126. For example, in an example combination of the third and fourth modes, when the display time statistic value exceeds a predetermined value and the average number of types of activated applications is less than a predetermined value and the number of calls is a predetermined value or more, the first determiner 126 determines the screen name as that of the screen on which the user is concentrating.

In the following description, the first determiner 126 in the first embodiment is assumed to determine the screen name of the screen on which the user U is concentrating, according to the first mode.

In the example shown in FIG. 6, the first determiner 126 determines, based on the average of the display time calculated for each screen name, the e-mail creation screen managed by the e-mail application and the video playback screen managed by the video playback application to be the screen names of the screens on which the user U is focused.

The exclusion list generator 128 generates the exclusion list EL. The exclusion list EL includes screen names for which the determination result from the first determiner 126 is affirmative. In the example shown in FIG. 6, the exclusion list generator 128 generates the exclusion list EL including the screen name "e-mail creation screen" of the e-mail creation screen managed by the e-mail application and the screen name "video playback screen" of the video playback screen managed by the video playback application.

The communication controller 129 transmits the exclusion list EL generated by the exclusion list generator 128 to the user apparatus 20.

The exclusion list acquirer 222 acquires the exclusion list EL from the server 10. In the example shown in FIG. 6, the exclusion list acquirers 222 of the user apparatuses 20_1 and 20_2 acquire the exclusion list EL from the server 10.

When the screen (screen name) displayed on the display 26 is included in the exclusion list EL, the decider 226 determines not to provide the assistance information HI to the user U. In contrast, when the screen (screen name) displayed on the display 26 is not included in the exclusion list EL, the decider 226 determines to provide the assistance information HI to the user U in accordance with the operation status. The information indicating the operation status is, for example, a bag-of-words feature value, which will be described later. In the example shown in FIG. 6, an e-mail creation screen managed by the e-mail application is displayed on the display 26 of the user apparatus 20_1, and the exclusion list EL includes an "e-mail creation screen".

Accordingly, the decider 226 of the user apparatus 20_1 determines not to provide the assistance information HI to the user. In contrast, the display 26 of the user apparatus 20_2 displays the dial pad screen managed by the video playback application, and the exclusion list EL does not include the "dial pad screen". Accordingly, the decider 226 of the user apparatus 20_2 determines to provide the assistance information HI to the user U in accordance with the operation status of the user U_2.

The display controller 228 causes the display 26 to display an image based on the assistance information HI. For example, the display controller 228 of the user apparatus 20_2 causes the display 26 to display an image based on the assistance information HI.

1.2. Operation of First Embodiment

The process executed by the control system 1 will now be explained with reference to FIGS. 9 and 10. The server 10 executes the exclusion list generation process shown in FIG. 9. The user apparatus 20 executes the assistance information providing process shown in FIG. 10.

Figure 9:
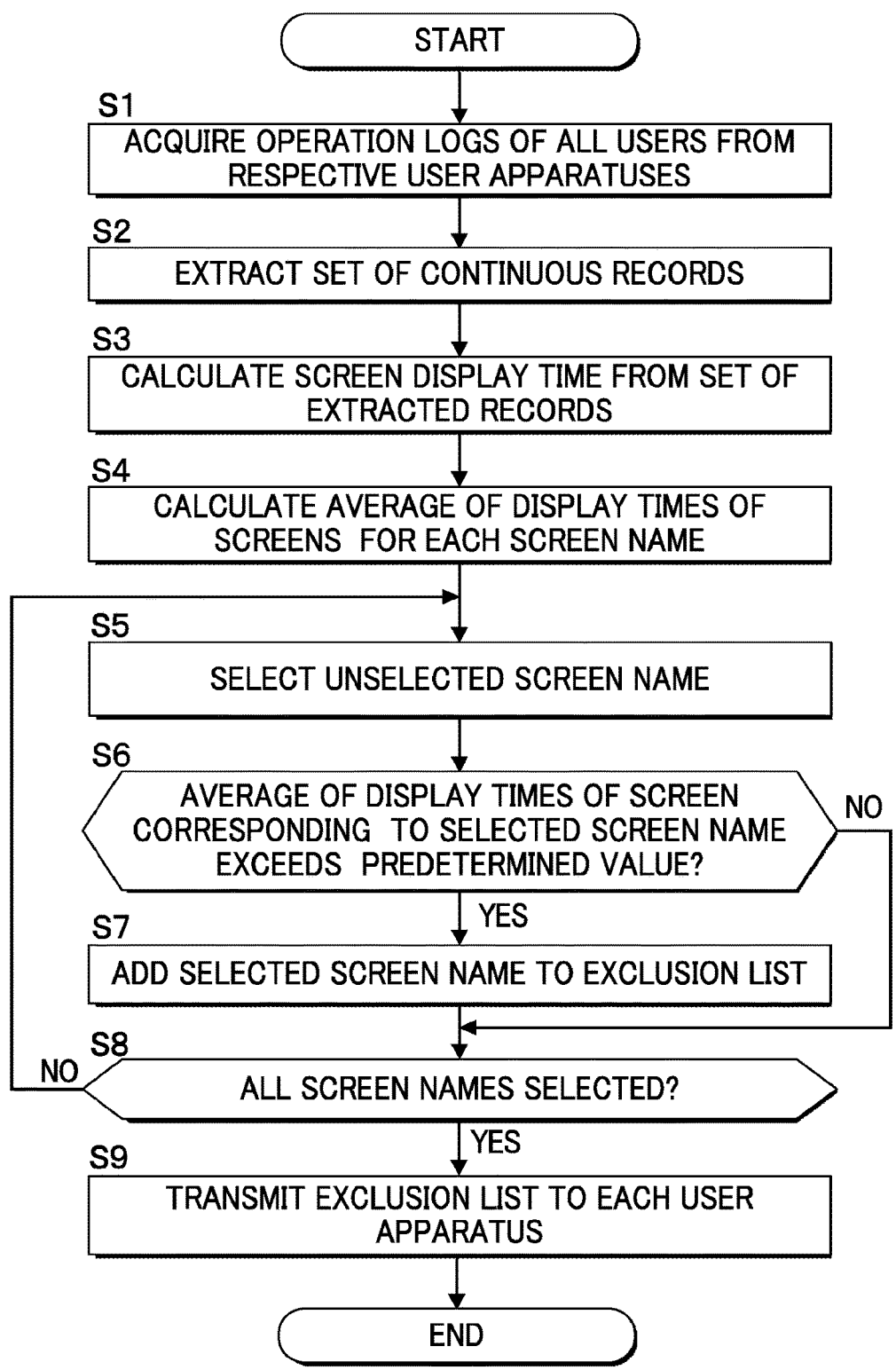
FIG. 9 is a diagram showing a flowchart of an exclusion list generation process.

FIG. 9 is a flowchart of an exclusion list generation process. The server 10 acquires the operation logs 142 of all users from the respective user apparatuses 20_1 to 20_m (Step S1). Next, the server 10 extracts, from the operation logs 142, a set of records in which the operation types foreground and background continuously alternate in the same apparatus ID (Step S2). Referring to the examples shown in FIGS. 3A and 3B, foreground and background continuously alternate in a set of records 1421-1 and 1421-2, a set of records 1421-3 and 1421-4, and a set of records 1421-5 and 1421-6.

The server 10 then calculates the display time of the screen using the set of extracted records (Step S3). In the examples shown in FIGS. 3A and 3B, the server 10 calculates, based on the set of the records 1421-1 and 1421-2, the display time of the first e-mail creation screen to be 20 seconds by subtracting 10:00:00 on Aug. 1, 2016, from 10:00:20 on Aug. 1, 2016. Similarly, the server 10 calculates the display time of the first call screen to be 40 seconds, using the set of the records 1421-3 and 1421-4. Similarly, the server 10 calculates the display time of the second e-mail creation screen to be 4 minutes, using the set of the records 1421-5 and 1421-6.

Next, the server 10 calculates the average of the display time of the screens for each screen name (Step S4). In the examples shown in FIGS. 3A and 3B, the server 10 calculates the average of the display time of the e-mail creation screen to be 2 minutes and 10 seconds, which is the average of 20 seconds and 4 minutes.

The server 10 then selects an unselected screen name from among the screen names appearing in the operation log 142 (Step S5), and determines whether the average of the display time of the screen corresponding to the selected screen name has exceeded a predetermined value (Step S6). When the determination result in Step S6 is affirmative, the server 10 adds the selected screen name to the exclusion list EL (Step S7). After the processing of Step S7 ends, or when the determination result in Step S6 is negative, the server 10 determines whether all screen names have been selected (Step S8). When the determination result in Step S8 is negative, that is, when there is an unselected screen name, the server 10 returns the process to Step S5. In contrast, when the determination result in Step S8 is affirmative, the server 10 transmits the exclusion list EL to each of the user apparatuses 20_1 to 20_m (Step S9). Note that the content of the exclusion list EL is the same for the user apparatuses 20. After the processing of Step S9 ends, the server 10 ends the series of processing steps illustrated in FIG. 9.

Figure 10:
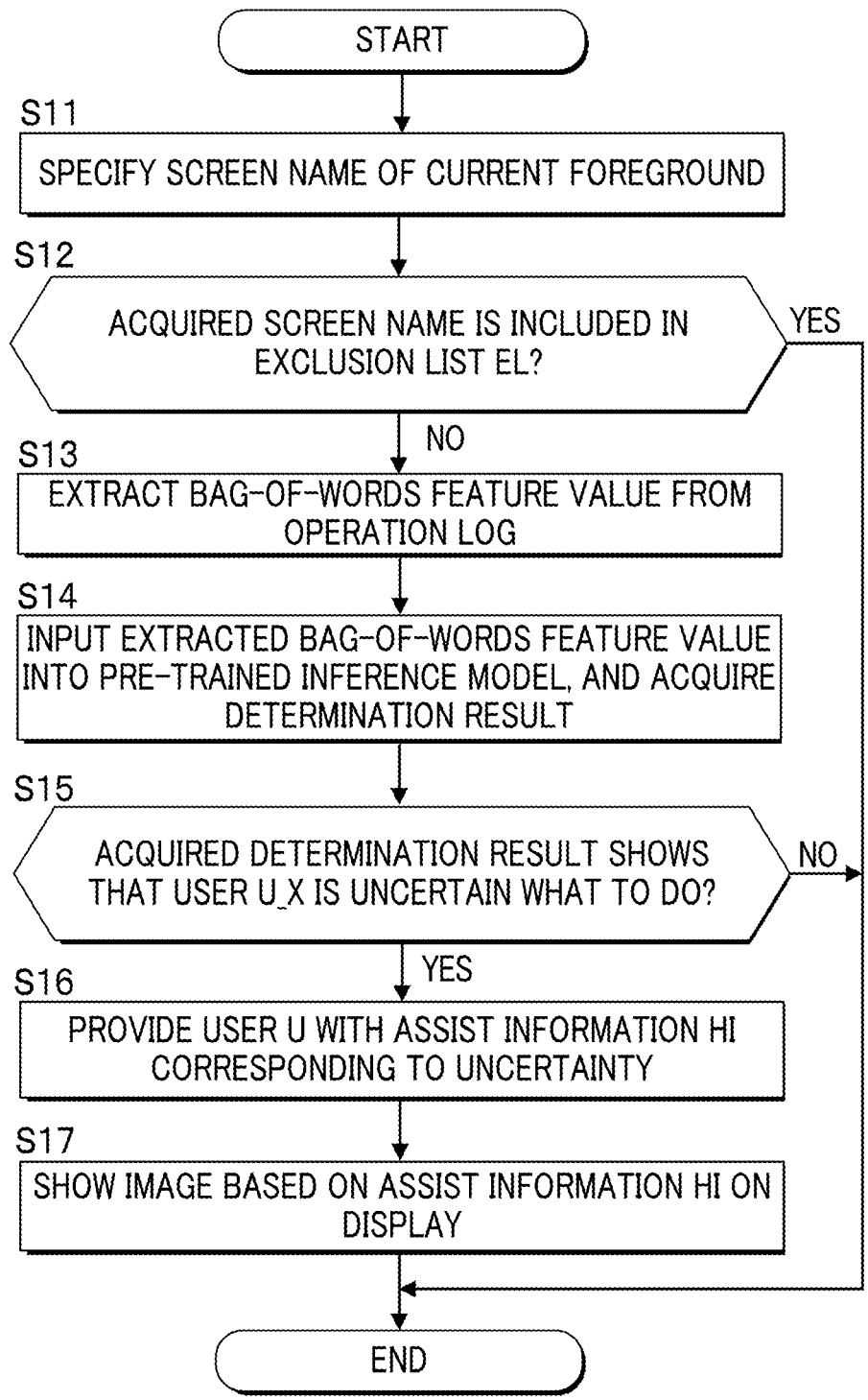
FIG. 10 is a diagram showing a flowchart of an assistance information providing process.

FIG. 10 is a flowchart showing an assistance information providing process. The user apparatus 20_x performs the assistance information providing process periodically or when a specific application is activated. Here, x is an integer from 1 to m. The term "periodically" means any time interval, for example, 10 seconds.

The user apparatus 20_x specifies the screen name of the current foreground by using the operation log 142_x (Step S11). Specifically, the user apparatus 20_x specifies the screen name of the current foreground by acquiring the screen name in the record with the latest date and time from the operation log 142_x.

Next, the user apparatus 20_x determines whether the acquired screen name is included in the exclusion list EL (Step S12). When the determination result in Step S12 is affirmative, the user apparatus 20_x ends the series of processing steps shown in FIG. 10.

In contrast, when the determination result of Step S12 is negative, the user apparatus 202 (extracts the bag-of-words feature value from the operation log 142_x (Step S13). Bag-of-words is an algorithm that counts the number of instances of each word in a document. The similarity between documents can be measured when the numbers of instances of each word are compared with each other. A bag-of-words feature value is the count of the number of instances each word. In the processing of Step S13, the user apparatus 20_x regards the screen name as one word and counts the number of instances of the corresponding screen, for each screen name.

Next, the user apparatus 20_x inputs the extracted bag-of-words feature value into a pre-trained inference model, and acquires a determination result, which indicates whether the user U_x is uncertain what to do, as an output of the inference model (Step S14). This inference model gives the output showing that the user U_x is uncertain what to do. This inference model also outputs details of the user's uncertainty. The details of uncertainty are, for example, uncertainty when how to use the screen is not known.

The user apparatus 20_x then determines whether the acquired determination result shows that the user U_x is uncertain what to do (Step S15). When the determination result in Step S15 is negative, the user apparatus 20_x ends the series of processings shown in FIG. 10.

In contrast, when the determination result in Step S15 is affirmative, the user apparatus 20_x determines to provide the user U with the assistance information HI corresponding to the uncertainty of the user U_x (Step S16). The user apparatus 20_x then shows the image based on the assistance information HI on the display 26 (Step S17). After the processing of Step S17 ends, the user apparatus 20_x ends the series of processing illustrated in FIG. 10.

1.3. Advantageous Effects of First Embodiment

As described above, according to the first embodiment, an information generation apparatus (e.g., "server") includes a first statistic processor configured to calculate, for each of different types of screen displayed on a display, a first statistic value of display time of a screen of each type displayed on the display, thereby generating first statistic values corresponding to the different types of screens; a first determiner configured to determine, for each type of the screen, whether a user is concentrating on a screen of each type, based on, from among the first statistic values, a first statistic value calculated for the screen of each type; and a generator (e.g., "exclusion list generator") configured to generate a list (e.g., "exclusion list") including screen identification information for identifying, from among the different types of screens, a type of screen for which a corresponding determination result from the first determiner is affirmative.

Specifically, the server 10 determines whether the user U is concentrating on each screen on the basis of the average of the display time of each screen displayed on the display 26. Next, when the determination result is affirmative, the server 10 determines this screen to be a screen on which the assistance information HI is not provided for assisting the user U in operation and generates an exclusion list EL including the determined screen name.

In general, when the user is concentrating on the screen, the user is less likely to be uncertain what to do, and there is therefore less need to provide the assistance information HI. Accordingly, in the first embodiment, the user apparatus 20 can determine whether the screen displayed on the display 26 is a screen on which the user U is concentrating, using the exclusion list EL. Consequently, the user apparatus 20 can reduce situations in which the assistance information HI is provided when the user U is concentrating on a screen and the interruption of the user U's concentration can be suppressed.

Furthermore, as shown in FIG. 10, when the screen name currently shown on the display 26 is included in the exclusion list EL, the processing of Step S13 and Step S14 can be skipped. Consequently, the load on the user apparatus 20 is reduced, and the battery consumption of the user apparatus 20 can be suppressed.

Furthermore, in the first mode of the first determiner 126, the first determiner determines a type of screen corresponding to a first statistic value exceeding a predetermined value from among the first statistic values, to be a type of screen on which the user U is concentrating.

Specifically, the first determiner 126 determines that the name of the screen, of which the average of display time exceeds a predetermined value, is the name of the screen on which the user U is concentrating. In general, when the user U is concentrating on the screen, the display time of this screen tends to be long. Accordingly, the screen name of the screen on which the user U is concentrating can be specified when the name of the screen, of which the average of the display time exceeds a predetermined value, is specified.

In addition, in the third mode of the first determiner 126, the first statistic processor specifies, for each type of screen, one or more unit periods including the time when each type of screen was displayed, and calculates a third statistic value based on the number of types of software programs that were activated in each of the specified unit periods, thereby generating the third statistic values corresponding to the types of screens. The first determiner determines, for each type of screen, whether the user is concentrating on a screen of each type, based on the corresponding first statistic value and third statistic value.

Specifically, the first determiner 126 determines whether the user U is concentrating on the screen having each screen name on the basis of both the average of the display time of a corresponding screen for each of the screen names and the number of types of applications activated for each of the screen names. In general, when the user U is concentrating on the screen, the user U can hardly concentrate on things other than this screen, so that the number of types of activated applications tends to be small. In contrast, when the user U does not concentrate on the screen, that is, when the user U is interrupted, the user U tends to activate various applications. Accordingly, the first determiner 126 determines whether the user U is concentrating, referring to the number of types of activated applications for each screen name. This determination leads to higher accuracy of determination of whether the user U is concentrating on the screen than in the case in which the number of types of activated applications for each screen name is not referred to.

In addition, in the fourth mode of the first determiner 126, the first statistic processor specifies, for each type of screen, one or more unit periods including the time when the screen of each type was displayed, and calculates a fourth statistic value based on the number of operations by the user in each of the specified unit periods, thereby generating the fourth statistic values corresponding to the types of screens. The first determiner determines, for each screen type, whether the user is concentrating on the screen of each type, based on the corresponding first statistic value and fourth statistic value.

Specifically, the first determiner 126 determines, for each screen name, whether the user is concentrating on each screen, based on the average of the display time of each screen name and the number of operations for each screen name. In general, when the user U is concentrating on the screen, the number of operations on this screen tends to be large. In contrast, when the user U is interrupted, the user U's hands tend to stop and the number of operations on this screen tends to decrease. For example, the user U is distracted when the user does not know how to operate on the screen or when the user operates the user apparatus 20 while watching TV. Accordingly, the first determiner 126 determines whether the user U is concentrating on the screen, referring to the number of operations for each screen name. This determination leads to higher accuracy of determination of whether the user U is concentrating than in the case in which the first determiner 126 does not refer to the number of operations for each screen name.

In the fifth mode of the first determiner 126, the first determiner 126 determines, for each screen name, whether the user is concentrating, based on both the display time statistic value for each screen name and the statistic value of the number of times the video library or still image library is accessed for each screen name. Examples of screens on which the user U is concentrating include video playback screens and social networking service (SNS) application posting screens. In general, the number of times the video library is accessed tends to increase on operation playback screens. Additionally, since posting screens show photographic images or images of illustrations posted by the user U, the number of times the video library or still image library is accessed tends to increase. Accordingly, the first determiner 126 determines whether the user U is concentrating on the screen, referring to the number of times the video library or still image library is accessed, for each screen name. This determination leads to higher accuracy of determination of whether the user U is concentrating on the screen than in the case in which the first determiner 126 does not refer to the number of times the video library or still image library is accessed for each screen name.

According to the first embodiment, the control system includes an information generation apparatus and information processing apparatuses (for example, "user apparatuses") each including a display and configured to communicate with the information generation apparatus. The information processing apparatuses each include: an acquirer configured to acquire the list from the information generation apparatus; a decider configured to determine not to provide the user with assistance information for assisting the user in operation when the list includes screen identification information indicating a type of screen displayed on the display, and to determine to provide the user with the assistance information in accordance with a status of the operation when the list includes screen identification information indicating a type of screen displayed on the display; and a display controller configured to cause the display to display an image based on the assistance information when the decider determines to provide the user with the assistance information. With this control system also, the screen name of the screen on which the user U is concentrating can be specified.

2. Second Embodiment

Although the average of display time of a screen is calculated for each screen name in the first embodiment, the average of display time of a screen is also calculated for each application in the second embodiment. The control system 1 according to the second embodiment will be described below. It should be noted that, in the second embodiment illustrated below, elements having the same effects or functions as those in the first embodiment are given the aforementioned reference numerals, and detailed description thereof will be omitted as appropriate.

2.1. Functions of Second Embodiment

FIG. 11 is a diagram illustrating the configuration of a server 10 according to a second embodiment. The storage device 14 stores an exclusion list ELa instead of the exclusion list EL. The exclusion list ELa indicates both a name of a screen of which the assistance information HI is not provided and a name of an application of which the assistance information HI is not provided.

FIG. 12 is a diagram showing an example content stored in an exclusion list ELa. The exclusion list ELa shown in FIG. 12 includes records ELa1-1 and ELa1-2. The record ELa1-1 is an example of a screen name of a screen on which the assistance information HI is not provided. The record ELa1-2 is an example of an application name of an application of which the assistance information HI is not provided. The record ELa1-1 shows that the e-mail creation screen managed by an e-mail application is a screen on which the assistance information HI is not provided. The record ELa1-2 shows that each of the screens managed by a text creation application is a screen of which the assistance information HI is not provided.

Description will now be given returning to FIG. 11. The processor 12 reads and executes the control program PR1 from the storage device 14, thereby functioning as a log acquirer 122, a first statistic processor 124, a second statistic processor 125, a first determiner 126, a second determiner 127, an exclusion list generator 128a, and a communication controller 129.

The second statistic processor 125 specifies, for each application that manages the screen shown on the display 26, the average of display time of the corresponding one or more screens. The second determiner 127 determines, for each application, whether the user is concentrating on the screen, based on the display time average specified for each application. The second determiner 127 can take the same mode as any of the six modes of the first determiner 126. Specifically, the difference is that "each screen name" in the first determiner 126 is replaced with "each application". The exclusion list generator 128a adds application names for which the determination result of the second determiner 127 is affirmative, to the exclusion list EL.

2.2. Advantageous Effects of Second Embodiment

As described above, according to the second embodiment, the second statistic processor further includes: a second statistic processor configured to calculate, for each of different software programs managing a screen displayed on the display, a second statistic value of display time of a screen displayed on the display, thereby generating second statistic values corresponding to the different software programs; and a second determiner configured to determine, for each of the different software programs, whether the user is concentrating on a screen corresponding to each software program, based on, from among the second statistic values, a second statistic value calculated for each software program. The generator is configured to add, to the list, software identification information for identifying, from among the software programs, a software program for which a corresponding determination result from the second determiner is affirmative.

Specifically, the server 10 determines, for each application, whether the user is concentrating on the screen, based on the display time average specified for each application, and adds an application name for which the determination result is affirmative to the exclusion list EL. The user apparatus 20 can determine whether the screen displayed on the display 26 is a screen on which the user U is concentrating, using the exclusion list EL. Consequently, the user apparatus 20 can reduce the situations in which the assistance information HI is provided when the user U is concentrating on the screen managed by the application. Thus, the interruption of the user's concentration can be suppressed.

3. Third Embodiment

In the third embodiment, when the user U is concentrating on the screen but the user U's concentration is then broken by some factor and the user U is then concentrating again on the same screen, the display time of the screen before and after the external factor are added up. The control system 1 according to the third embodiment will be described below. In should be noted that, in the third embodiment explained below, the same reference numerals as above are used for components having the same effects or functions as those of the first embodiment, and detailed description thereof will be omitted as appropriate.

3.1. Functions of Third Embodiment

FIG. 13 is a diagram illustrating the configuration of the server 10 according to a third embodiment. The storage device 14 stores a work interruption application list IL besides the information described in the first embodiment. The work interruption application list IL is a list of applications for which notification to the user U may interrupt the user's work. Examples of applications registered in the work interruption application list IL include telephone applications, alarm applications, and scheduler applications. The applications registered in the work interruption application list IL will be hereinafter referred to as "work interruption applications". Work interruption applications are an example of a "predetermined software program".

In the third embodiment, the first statistic processor 124b has the following two modes. In the first mode of the first statistic processor 124b, the first statistic processor 124b determines whether a work interruption application is activated and the application that manages the previous screen displayed before the screen managed by the work interruption application is identical to the application that manages the subsequent screen displayed after the screen managed by the work interruption application. In the following description, the screen managed by the work interruption application will be referred to as a "work interruption screen", and the previous screen displayed before the work interruption screen will be referred to as a "pre-interruption screen" and the subsequent screen displayed before the work interruption screen will be referred to as a "post-interruption screen".

When the work interruption application is activated and the application managing the pre-interruption screen is identical to the application managing the post-interruption screen, the first statistic processor 124b replaces the display time of the pre-interruption screen or the display time of the post-interruption screen with the sum total of the display time of the pre-interruption screen and the display time of the post-interruption screen, and specifies the display time average for each type of screen.

The display time to be replaced may be either the display time of the pre-interruption screen or the display time of the post-interruption screen. The display time to not be replaced is not a candidate for which the display time average is calculated. In the following description, the display time to be replaced is supposed to be the display time of the pre-interruption screen.

The pre-interruption screen has the following two modes, for example. The pre-interruption screen in the first mode is a screen displayed immediately before the work interruption screen. The pre-interruption screen in the second mode is a screen displayed before the work interruption screen by a predetermined number screens.

The post-interruption screen has three modes. The post-interruption screen in the first mode is a screen displayed immediately after the work interruption screen. The post-interruption screen in the second mode is a screen displayed after the work interruption screen by a predetermined number screens. The post-interruption screen in the third mode is, from among the screens displayed in the period from a time when a screen is displayed immediately after the work interruption screen to a time when a screen is displayed after the work interruption screen by a predetermined number screens, the screen managed by the same application as the application that manages the pre-interruption screen.

The first mode of the first statistic processor 124b will be described referring to FIGS. 3A and 3B as an example. The pre-interruption screen and the post-interruption screen are supposed to be in the first mode. In the records 1421-3 and 1421-4, a telephone application, which is a work interruption application, is activated. Accordingly, referring to the operation log 142, the first statistic processor 124b determines the e-mail creation screen indicated by the records 1421-1 and 1421-2 to be a pre-interruption screen, and the e-mail creation screen indicated by the records 1421-5 and 1421-6 to be a post-interruption screen. Since the same application, that is, the e-mail application, manages the pre-interruption screen and the post-interruption screen, the first statistic processor 124b calculates the display time of the pre-interruption screen according to the following equation (1).

$$\text{Pre-interruption screen display time} = \text{pre-interruption screen display time} + \text{post-interruption screen display time} \quad (1)$$

In the example shown in FIGS. 3A and 3B, the display time of the previous screen is 20 seconds and the display time of the post-interruption screen is 4 minutes; accordingly, the first statistic processor 124b changes the display time of the pre-interruption screen from 20 seconds to 4 minutes and 20 seconds. The first statistic processor 124b then specifies the display time average corresponding to the type of the previous screen.

In the second mode of the first statistic processor 124b, when the home screen is displayed during the period from when the pre-interruption screen is displayed to when the screen managed by the work interruption application is displayed, the first statistic processor 124b does not replace the display time corresponding to the type of the pre-work screen with the total sum. The home screen is an example of a standby screen for waiting for the user U's operations.

3.2. Operation of Third Embodiment

The exclusion list generation process in the third embodiment executed by the server 10 will now be explained with reference to FIGS. 14 and 15.

Figure 14:
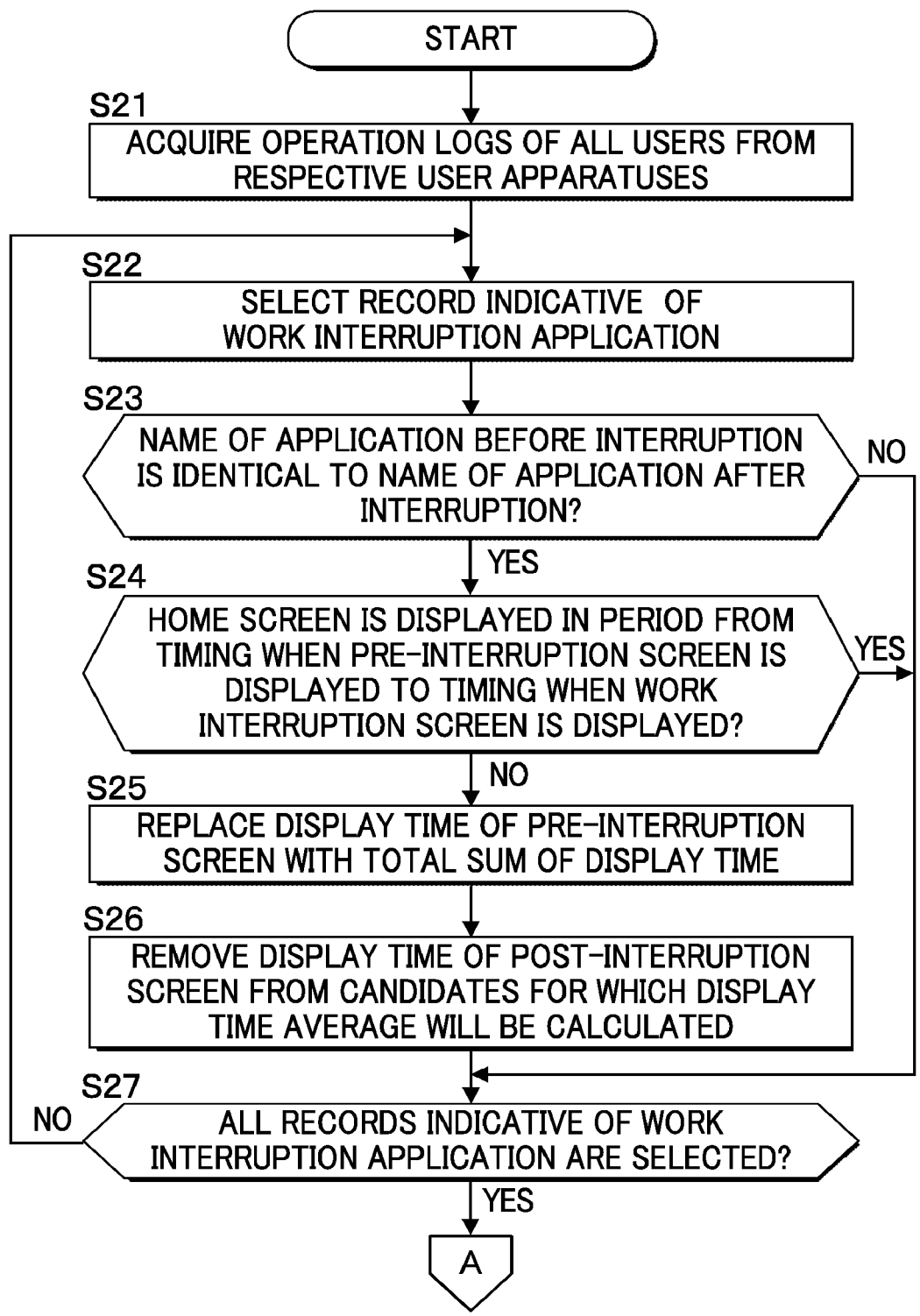
FIG. 14 is a diagram (No. 1) showing a flowchart of an exclusion list generation process in the third embodiment.
Figure 15:
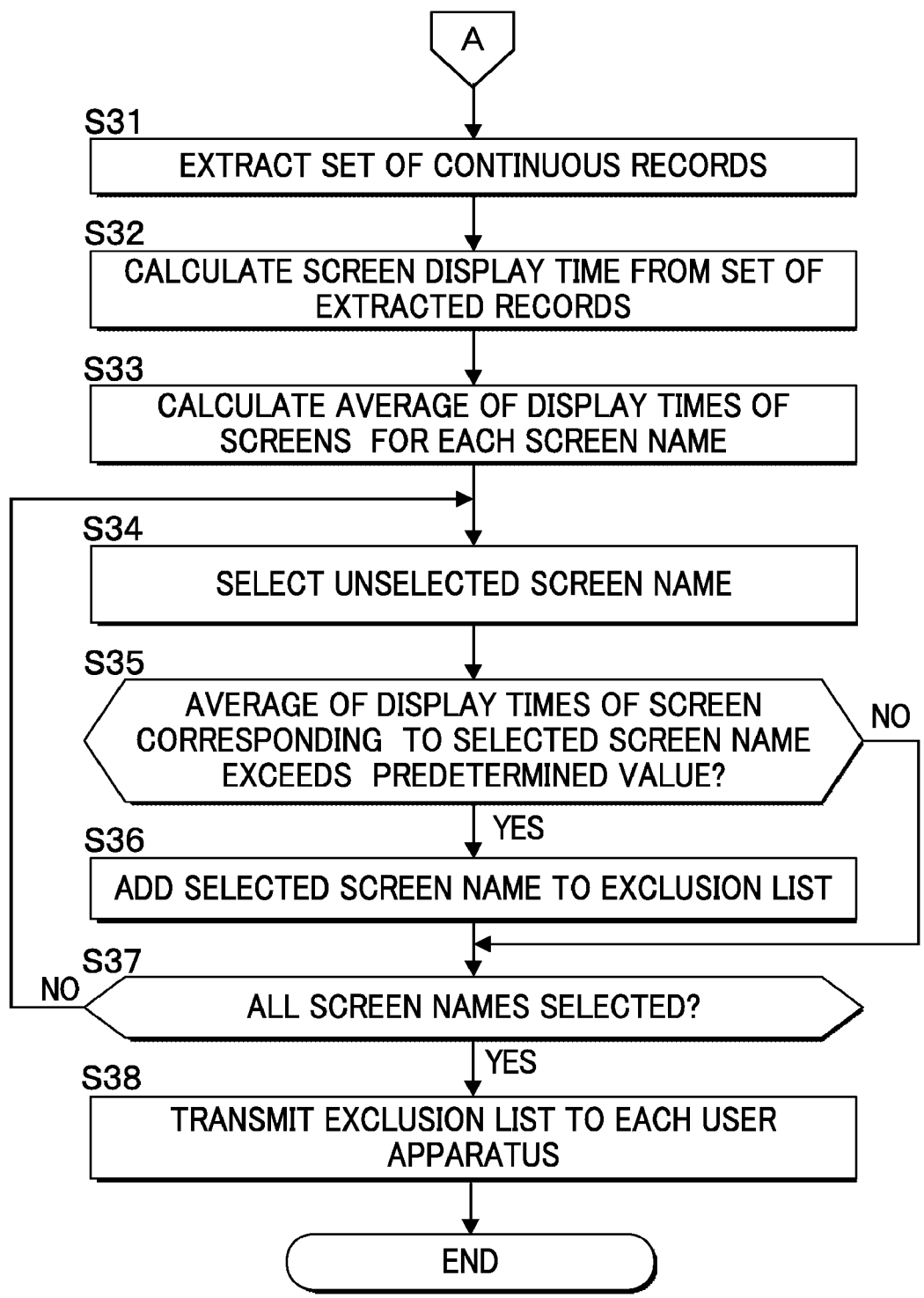
FIG. 15 is a diagram (No. 2) showing a flowchart of the exclusion list generation process in the third embodiment.

FIGS. 14 and 15 are flowcharts of the exclusion list generation process in the third embodiment. Steps S31 to S38 shown in FIG. 15 are the same as Steps S2 to S9, and description thereof will therefore be omitted. Moreover, for simplification of description, the operation log 142 is sorted by the apparatus ID and the date and time as shown in FIGS. 3A and 3B, and the records are supposed to be stored in chronological order, that is, records with older dates and times are stored first.

The server 10 acquires the operation logs 142 of all users from the respective user apparatuses 20_1 to 20_m (Step S21). The server 10 then selects a record indicating a work interruption application from the operation log 142 (Step S22). When there are multiple records indicating a work interruption application in the operation log 142, the server 10 selects, for example, the record having the oldest date and time among the records indicating a work interruption application.

The server 10 then determines whether the name of the application before interruption indicated by the record before the selected record is the same as the name of the application after interruption indicated by the record after the selected record (Step S23). Note that the apparatus IDs of the record before and after the selected record is supposed to match the apparatus ID of the selected record. Since the operation logs 142 are sorted in ascending order of date and time, the previous record relates to the operation that occurred before the operation of the selected record. The subsequent record relates to an operation that occurred after the operation of the selected record.

The reason the name of the application before interruption is compared with the name of the application after interruption without comparing the name of the screen before interruption with the name of the screen after interruption is that, when a background application becomes a foreground, depending on the OS, the screen that was being displayed when the application was the background is not displayed, and the top screen of the application may be displayed.

When the determination result of Step S23 is affirmative, the server 10 subsequently determines whether the home screen has been displayed in the period from a timing when the pre-interruption screen is displayed to a timing when the work interruption screen is displayed (Step S24). "The home screen has been displayed in the period from when the pre-interruption screen is displayed to when the work interruption screen is displayed" means that "the user U has actively activated the work interruption application." At the time when the user U actively activates the work interruption application, the user U does not concentrate on the pre-interruption screen. When the determination result of Step S24 is negative, the server 10 replaces the display time of the pre-interruption screen with the total sum of the display time of the pre-interruption screen and the display time of the post-interruption screen (Step S25). The server 10 then removes the display time of the post-interruption screen from the candidates for which the display time average will be calculated (Step S26).

After the processing of Step S26, the server 10 determines whether all the records indicating the work interruption application have been selected (Step S27). When the determination result of Step S23 is negative or when the determination result of Step S24 is affirmative, the server 10 executes the processing of Step S27.

When the determination result of Step S27 is negative, that is, when there is, among the records indicating the work interruption application, any record that has not been selected, the server 10 returns the process to Step S22. When the process returns to Step S22, in Step S22, the server 10 selects the record with the oldest date and time among the unselected records indicating the work interruption application.

In contrast, when the determination result of Step S27 is affirmative, that is, when all the records indicating the work interruption application are selected, the server 10 executes the process of Step S31.

3.3. Advantageous Effects of Third Embodiment

As described above, according to the third embodiment, when the display sequentially shows a first screen (e.g., a "pre-interruption screen") managed by a first software program, a second screen (e.g., a "work interruption screen") managed by a second software program (e.g., a "work interruption application") different from the first software program, and a third screen (e.g., "post-interruption screen") managed by a third software program, when the first software program is the same as the third software program, the first statistic processor calculates the total time by adding up a first display time of the first screen and a third display time of the third screen, and replaces one of the first display time and the third display time.

Specifically, when the work interruption application is activated and the name of the application before the interruption is identical to the name of the application after the interruption, the server 10 replaces the display time of the pre-interruption screen with the total time of the display time of the pre-interruption screen and the display time of the post-interruption screen. When the work interruption application does not start up, the user U would have continued to concentrate on the pre-interruption screen. Accordingly, adding up the display time of the pre-interruption screen and the display time of the post-interruption screen with the server 10 can determine the time for which the user U would concentrate on the screen. Determining the time for which the user U would concentrate on the screen makes is possible to improve the accuracy of determination of whether the user U is concentrating on the screen.

When a standby screen for waiting for the user's operation is shown during the period from when the first screen is shown to when the second screen is shown, the first statistic processor does not replace one of the first display time and the third display time with the total time.

Specifically, when the home screen has been displayed in the period from a time when the pre-interruption screen is displayed to a time when the work interruption screen is displayed, the server 10 does not replace the display time of the pre-interruption screen with the total time of the display time of the pre-interruption screen and the display time of the post-interruption screen. "The home screen has been displayed in the period from a time when the pre-interruption screen is displayed to a time when the work interruption screen is displayed" means that "the user U has manually activated the work interruption application." At the time when the user U manually activates the work interruption application, the user U does not concentrate on the pre-interruption screen. Accordingly, since the total time is not replaced, the accuracy of determination of whether the user U is concentrating can be improved.

4. Fourth Embodiment

In the first embodiment, the user apparatus 20 uses the exclusion list EL transmitted from the server 10 to determine whether to provide the assistance information HI to the user U. In contrast, in the fourth embodiment, when a predetermined period of time elapses after the screen is displayed on the display 26, the user apparatus 20_x generates an update exclusion list ELu based on its own operation log 142_x and determines whether to provide the assistance information HI to the user U, using an update exclusion list ELu. The control system 1 according to the fourth embodiment will be described below. In should be noted that, in the fourth embodiment illustrated below, the aforementioned reference numerals are used for the components having the same effects or functions as those of the first embodiment, and detailed description thereof will be omitted as appropriate.

4.1. Functions of Fourth Embodiment

Figure 16:
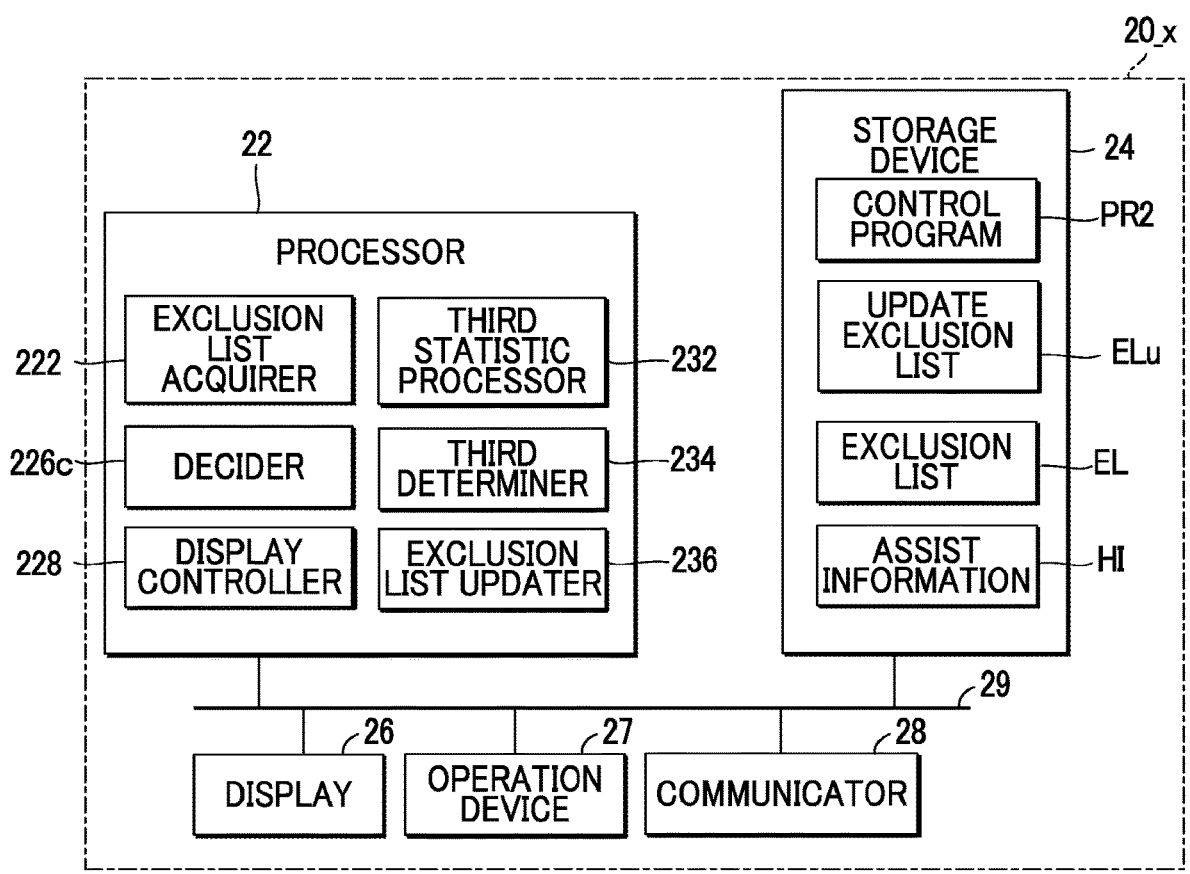
FIG. 16 is a diagram illustrating the configuration of a user apparatus 20_x according to a fourth embodiment.

FIG. 16 is a diagram illustrating the configuration of a user apparatus 20_x according to the fourth embodiment. The storage device 24 stores the update exclusion list ELu generated by the processor 22 in the fourth embodiment, in addition to the information described in the first embodiment. Like the exclusion list EL, the update exclusion list ELu shows the names of screens on which the assistance information HI is not provided to the user U_x.

The processor 22 reads the control program PR2 from the storage device 24 and executes the control program PR2. Executing this, the processor 22 functions as an exclusion list acquirer 222, a decider 226c, a display controller 228, a third statistic processor 232, a third determiner 234, and an exclusion list updater 236. The exclusion list updater 236 is an example of an "updater".

The third statistic processor 232 specifies the display time average for each type of screen displayed on the display 26 when a predetermined period has elapsed since the screen was displayed on the display 26. The predetermined period has, for example, the following two modes. The first mode of the predetermined period is a fixed value. The second mode of the predetermined period is the period from a time when a screen is first displayed on the display 26 to a time when the number of records in the operation log 142_x reaches or exceeds a predetermined number.

The third determiner 234 determines whether the user U_x is concentrating on the screen, for each screen type, based on the display time average specified by the third statistic processor 232 for each screen type.

The exclusion list updater 236 generates the update exclusion list ELu including a screen name for which the determination result from the third determiner 234 is affirmative. The update exclusion list ELu is an example of an "update list".

The decider 226c determines whether to provide the assistance information HI to the user U_x based on the exclusion list EL until the predetermined period elapses. The decider 226c determines whether to provide the assistance information HI to the user U_x based on the update exclusion list ELu after the predetermined period has elapsed.

4.2. Advantageous Effects of Fourth Embodiment

As described above, according to the fourth embodiment, the user apparatus 20 determines, based on the exclusion list EL, whether to provide the assistance information HI to the user U_x until the predetermined period elapses, and determines, based on the update exclusion list ELu, whether to provide the assistance information HI to the user U_x after the predetermined period has elapsed.

Accordingly, until the predetermined period elapses, that is, when records are not sufficiently accumulated in the operation log 142_x, whether the user U_x is concentrating on the screen is determined using the exclusion list EL generated by the server 10. This determination maintains the accuracy of determination of whether the user U_x is concentrating on the screen. Furthermore, after the predetermined period has elapsed, that is, when records have sufficiently accumulated in the operation log 142_x, the user apparatus 20 determines whether the user U_x is concentrating, using the update exclusion list ELu generated based on the operation log 142_x. The operation log 142_x reflects the operation history of only the user U_x. This leads to higher accuracy of determination of whether the user U is concentrating on the screen more than in the case in which the user apparatus 20 determines whether the user U_x is concentrating using the exclusion list EL.

5. Fifth Embodiment

In the fourth embodiment, the user apparatus 20_x calculates the screen display time average for each screen name. In contrast, in the fifth embodiment, the screen display time average is calculated for each application. The control system 1 according to the fifth embodiment will be described below. In should be noted that, in the fifth embodiment illustrated below, the same aforementioned reference numerals are used for the components having the same effects or functions as those of the fourth embodiment, and detailed description thereof will be omitted as appropriate.

5.1. Functions of Fifth Embodiment

Figure 17:
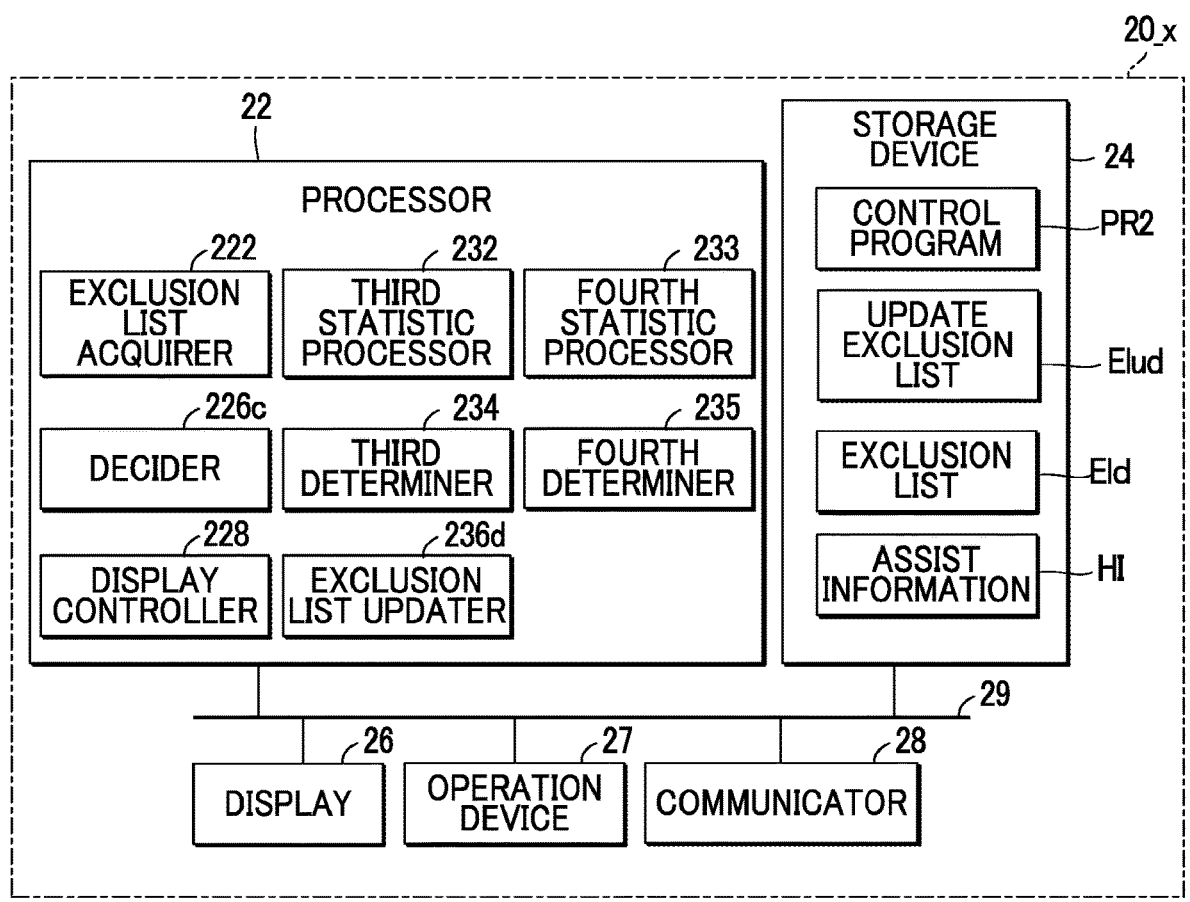
FIG. 17 is a diagram illustrating the configuration of a user apparatus 20_x according to a fifth embodiment.

FIG. 17 is a diagram illustrating the configuration of a user apparatus 20_x according to a fifth embodiment. The storage device 14 stores the exclusion list ELd instead of the exclusion list EL, and stores the update exclusion list ELud instead of the update exclusion list ELu. The exclusion list ELd and the update exclusion list ELud indicate a name of a screen to which the assistance information HI is not provided, and a name of an application of which the assistance information HI is not provided.

The processor 22 reads the control program PR2 from the storage device 24 and executes the control program PR2.

This execution allows the processor 22 to function as an exclusion list acquirer 222, a decider 226, a display controller 228, a third statistic processor 232, a fourth statistic processor 233, a third determiner 234, a fourth determiner 235, and an exclusion list updater 236d.

The fourth statistic processor 233 specifies the display time average for each application that manages the screen displayed on the display 26 when a predetermined period has elapsed since the screen was displayed on the display 26.

The fourth determiner 235 determines, for each application, whether the user is concentrating, based on the display time average calculated for each application.

The exclusion list updater 236d adds application names for which the determination result of the fourth determiner 235 is affirmative to the update exclusion list ELud.

5.2. Advantageous Effects of Fifth Embodiment

As described above, according to the fifth embodiment, the fourth determiner 235 determines, for each application, whether the user is concentrating on the screen, based on the display time average specified for each application, and the exclusion list updater 236d adds application names for which the determination result is affirmative to the update exclusion list ELud.

The user apparatus 20 can determine whether the screen displayed on the display 26 is a screen on which the user U is concentrating, by using the update exclusion list ELud. Consequently, the user apparatus 20 can reduce situations in which the assistance information HI is provided when the user U is concentrating on the screen managed by the application, and the interruption of the concentration of the user can be suppressed.

6. Sixth Embodiment

The present invention is not limited to the embodiments illustrated above. Specific modes of modification will be exemplified below. Two or more modes freely selected from the following examples may be used in combination.

(1) In the first modification, the decider 226 in each of the aforementioned embodiments may determine whether to provide the assistance information HI to the user, based on both the number of types of applications activated within a predetermined period and the number of user operations within the predetermined period.

Figure 18:
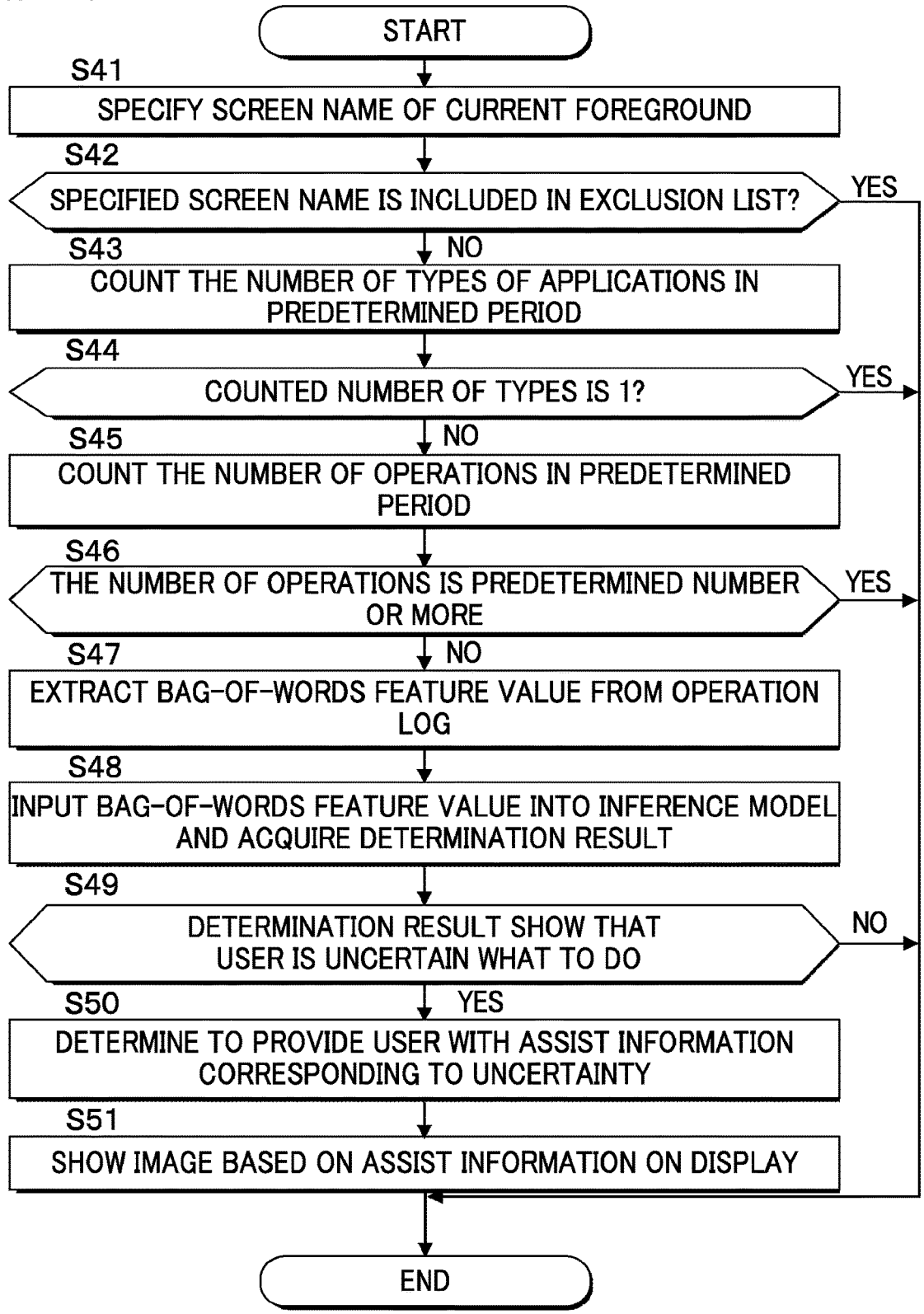
FIG. 18 is a diagram showing a flowchart of an assistance information providing process in a first modification.

FIG. 18 is a diagram showing a flowchart of an assistance information providing process in a first modification. The user apparatus 20_x specifies the screen name of the current foreground from the operation log 142_x (Step S41). Next, the user apparatus 20_x determines whether the specified screen name is included in the exclusion list EL (Step S42). When the determination result in Step S42 is affirmative, the user apparatus 20_x ends the series of processing steps shown in FIG. 18.

In contrast, when the determination result in Step S42 is negative, the user apparatus 20_x (counts the number of types of applications in a predetermined period (Step S43). The predetermined period is, for example, the most recent one hour. The user apparatus 20_x then determines whether the counted number of types is 1. (Step S44). When the determination result of Step S44 is affirmative, that is, when the counted number of types is 1, the user apparatus 20_x ends the series of processing steps illustrated in FIG. 18.

In contrast, when the determination result of Step S44 is negative, that is, when the counted number of types is two or more, the user apparatus 20_x counts the number of operations in a predetermined period (Step S45). The user apparatus 20_x then determines whether the number of operations is a predetermined number or more (Step S46). When the determination result in Step S46 is affirmative, the user apparatus 20_x ends the series of processing steps shown in FIG. 18.

In contrast, when the determination result of Step S46 is negative, the user apparatus 20_x extracts the bag-of-words feature value from the operation log 142 (Step S47). The user apparatus 20_x then inputs the extracted bag-of-words feature value into a pre-trained inference model, and acquires a determination result indicating whether the user U_x is uncertain what to do (Step S48).

The user apparatus 20_x then determines whether the acquired determination result shows that the user U_x is uncertain what to do (Step S49). When the determination result in Step S49 is negative, the user apparatus 20_x ends the series of processing steps shown in FIG. 18.

In contrast, when the determination result in Step S49 is affirmative, the user apparatus 20_x determines to provide the user U_x with the assistance information HI corresponding to the uncertainty of the user U_x (Step S50). The user apparatus 20_x then shows the image based on the assistance information HI on the display 26 (Step S51). After the processing of Step S51 ends, the user apparatus 20_x ends the series of processing steps illustrated in FIG. 18.

(2) The control system 1 in the aforementioned embodiments includes the server 10 and the user apparatus 20. Alternatively, the user apparatus 20 may independently generate an exclusion list EL including screen names. Furthermore, the user apparatus 20 may independently include application names in the exclusion list EL. When the user apparatus 20 independently generates an exclusion list EL including screen names, the user apparatus 20 is an example of an "information generation apparatus".

(3) In the aforementioned embodiments, a screen display time statistic value is denoted as an average or a median, but is not necessarily it and may be a mode instead. However, since a screen display time is a continuous value and is not suitably a mode, the server 10 may obtain the frequency distribution of the display time and determines the center value of the frequencies having the largest distribution to be the mode.

(4) In the aforementioned embodiments, in the fourth mode of the first determiner 126, the first statistic processor 124 calculates, for each screen name, the statistic value of the number of operations by the user U within a unit period including the screen display time but may instead simply calculate the statistic value of the number of operations for each screen name.

(5) The block diagrams used for the description of the aforementioned embodiments show function unit blocks. These functional blocks (constituent parts) are implemented with a freely chosen hardware and/or software combination. There is no limitation on the means for implementing each functional block. In other words, each functional block may be implemented by one physically and/or logically combined device, or by two or more devices physically and/or logically separated and directly and/or indirectly connected (for example, by wire and/or wirelessly).

(6) The notification of information is not necessarily like in the modes/embodiments described herein, and may be performed by a different method. For example, the notification of information may be performed using physical layer signaling (e.g., downlink control information (DCI) or uplink control information (UCI)), upper layer signaling (e.g., radio resource control (RRC) signaling, medium access control (MAC) signaling, or notification information (master information block (MIB) or system information block (SIB))), other signals, or a combination thereof. The RRC signaling may be referred to as an RRC message, and may be, for example, an RRC connection setup message, an RRC connection reconfiguration message, or the like.

(7) The order of the processing procedures, sequences, flowcharts, and the like in each of the aforementioned embodiments may be changed as long as no conflict occurs. For example, the methods described herein present elements of various steps in an illustrative order, and do not necessarily mean the specific order presented.

(8) A specific operation that is supposed to be performed by a base station (for example, identification of location information by the base station) may be performed by its upper node in some cases. It is obvious that in a network of one or more network nodes with a base station, various operations performed for communication with terminals can be performed by the base station and/or network nodes other than the base station (which are, for example, but are not limited to, MME or S-GW). Although the case in which there is one network node other than the base station has been described above, a combination of other network nodes (for example, MIME and S-GW) may be used instead.

(9) Information and the like can be output from an upper layer (or lower layer) to a lower layer (or an upper layer). It may be input or output via network nodes.

(10) In the aforementioned embodiments, the input/output information and the like may be stored in a specific location (for example, a memory) or may be managed using a management table. Input/output information and the like may be overwritten, updated, or added. The output information and the like may be deleted. The input information and the like may be transmitted to other devices.

(11) In the aforementioned embodiments, the determination may be performed using a one-bit value (0 or 1) or a Boolean (true or false), or by comparison between numerical values (for example, comparison with a predetermined value).

(12) In the aforementioned embodiments, a portable information processing apparatus such as a mobile phone or a smartphone is illustrated as the user apparatus 20, but a specific mode of the user apparatus 20 may be freely selected and is not limited to that illustrated in each of the aforementioned modes. For example, a portable or stationary personal computer may be used as the user apparatus 20.

(13) In the aforementioned embodiments, the storage device 14 is a recording medium that can be read by the processor 12, for which a ROM and a RAM were given as examples, but it may be a flexible disc, a magnetooptical disk (e.g., a compact disc, a digital versatile disc, or a Blu-ray (registered trademark) disc), a smart card, a flash memory device (e.g., a card, a stick, or a key drive), a compact disc-ROM (CD-ROM), a register, a removable disk, a hard disk, a floppy (registered trademark) disk, a magnetic strip, a database, a server, or other appropriate storage media. Programs may be transmitted from the network NW. Alternatively, programs may be transmitted from a communication network via an electronic communication line. The storage device 24 is similar to the storage device 14.

(14) It may be applied to systems using Long Term Evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultrawideband (UWB), Bluetooth (registered trademark), and other appropriate systems, and/or next-generation systems extended based on the system.

(15) In the aforementioned embodiments, the information, signals, and the like described above may be represented using any of a variety of different technologies. For example, data, instructions, commands, information, signals, bits, symbols, chips, and the like that may be mentioned throughout the above description may be represented by voltage, current, electromagnetic waves, magnetic fields or particles, optical fields or photons, or a freely selected combination thereof.

It should be noted that the terms described in this specification and/or terms necessary for understanding this specification may be replaced by terms having the same or similar meanings.

(16) The functions illustrated in FIGS. 2, 11, 13, 16, and 17 are implemented by a freely selected combination of hardware and software. Each function may be implemented by a single device, or may be implemented by two or more separate devices.

(17) The programs illustrated in the aforementioned embodiments should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or other names.

In addition, software, instructions, and the like may be transmitted and received via a transmission medium. For example, when the software is transmitted from a website, a server, or other remote sources using wired technology, such as a coaxial cable, fiber optic cable, twisted pair cable, or digital subscriber line (DSL), and/or wireless technology, such as infrared, wireless, or microwave technology, these wired and/or wireless technologies are included within the definition of the transmission medium.

(18) In the aforementioned embodiments, the terms "system" and "network" are used interchangeably.

(19) In the aforementioned embodiments, information, parameters, and the like may be represented by absolute values, values relative to a predetermined value, or other corresponding information. For example, wireless resources may be indicated by indexes.

(20) The names used for the aforementioned parameters are not limited in any way. Furthermore, the mathematical formulas and the like that use these parameters may differ from those explicitly disclosed herein. Since various channels (e.g., PDCCH and PDCCH) and information elements (e.g., TPC) can be identified by any suitable name, the various names assigned to these various channels and information elements are not limited in any way.

(21) A base station can accommodate one or more (e.g., three) cells (also called sectors). When a base station accommodates multiple cells, the entire coverage area of the base station can be divided into multiple smaller areas, and each smaller area can provide a communication service using a base station subsystem (e.g., a compact indoor base station: a remote radio head (RRH)). The term "cell" or "sector" refers to part or all of the coverage area of a base station and/or base station subsystem that provides a communication service in this coverage. The terms "base station", "eNB", "cell", and "sector" may be interchangeably used herein. A base station may be denoted by terms such as fixed station, NodeB, eNodeB (eNB), access point, femtocell, and small cell.

(22) In the aforementioned embodiments, the user apparatus 20 may be a mobile station. Those skilled in the art may refer to a mobile station as a subscriber station, mobile unit, subscriber unit, wireless unit, remote unit, mobile device, wireless device, wireless communicator, remote device, mobile subscriber station, access terminal, mobile terminal, wireless terminal, remote terminal, handset, user agent, mobile client, client, or other appropriate terms.

(23) In the aforementioned embodiments, the term "connected" or any variation thereof means any direct or indirect connection or coupling between two or more elements, and can mean the presence of one or more intermediate elements between two elements that are "connected" to each other. The connections between the elements may be physical, logical, or a combination thereof. When used herein, two elements are supposed to be "connected" using one or more wires, cables and/or printed electrical connections, and electromagnetic energy, such as electromagnetic energy, having a wavelength in the radio frequency range, microwave range, and (both visible and invisible) light ranges as some non-limiting and non-inclusive examples.

(24) In the aforementioned embodiments, the phrase "based on" used in this specification does not mean "based only on" unless otherwise explicitly stated. In other words, the phrase "based on" means both "based only on" and "based on at least".

(25) Any reference to an element using the designation "first", "second", or the like used herein does not generally limit the quantity or order of these elements. These designations may be used herein as a convenient way of distinguishing between two or more elements. Accordingly, references to the first and second elements do not mean that only two elements may be employed therein, or that the first element must precede the second element in any way.

(26) As long as the terms "including", "comprising", and variations thereof in the aforementioned embodiments are used herein or in claims, these terms are, like the term "comprising", intended to be inclusive. In addition, the term "or" used herein or in claims is not intended to be an exclusive OR.

(27) Throughout this application, when the translation adds articles, such as "a", "an", and "the" in English, these articles include plurals unless otherwise clearly indicated by the context.

(28) It will be apparent to those skilled in the art that the present invention is not limited to the embodiments described herein. The present invention can be implemented in modified and changed modes without departing from the spirit and scope of the present invention defined based on the description of the claims. Therefore, the description herein is intended to be illustrative and does not have any restrictive meaning in relation to the present invention. In addition, a plurality of modes selected from the modes illustrated herein may be used in combination.

DESCRIPTION OF REFERENCE SIGNS

1: Control system, 10: Server, 20: User device, 22: Processor, 122: Log acquirer, 124, 124*b*: First statistic processor, 125: Second statistic processor, 126: First determiner, 127: Second determiner, 128, 128*a*: Exclusion list generator, 142: Operation log, 222: Exclusion list acquirer, 226, 226*c*: Decider, 228: Display controller, 232: Third statistic processor, 233: Fourth statistic processor, 234: Third determiner, 235: Fourth determiner, 236, 236*d*: Exclusion list updater, EL, Ela: Exclusion list, ELu, Elud: Update exclusion list, U: User.

The invention claimed is:

1. An information generation apparatus comprising:
processing circuitry configured to:
calculate, for each of different types of screens displayed on a display, a first statistic value of display time of a screen displayed on the display, to generate first statistic values corresponding to the different types of screens;
determine, for each of the different types of screens, whether a user is concentrating on the screen, based on the first statistic value calculated for the screen; and
generate a list indicative of a type of screen for which a corresponding determination result from the first determiner is affirmative, the list indicating the type of screen as a type of screen for which assistance information for assisting the user in an operation is not to be provided to the user.

2. The information generation apparatus according to claim 1,
wherein the processing circuitry is configured to
calculate, for each of different software programs managing a screen displayed on the display, a second statistic value of display time of a screen displayed on the display, to generate second statistic values corresponding to the different software programs;
determine, for each of the different software programs, whether the user is concentrating on a screen corresponding to each software program, based on, from among the second statistic values, a second statistic value calculated for each software program; and
add, to the list, software identification information for identifying, from among the software programs, a software program for which a corresponding determination result from the second determiner is affirmative.

3. The information generation apparatus according to claim 1, wherein in a situation in which the display sequentially displays: a first screen managed by a first software program; a second screen managed by a second software program different from the first software program; and a third screen managed by a third software program, the processing circuitry is configured to calculate a total time by adding up a first display time of the first screen to a third display time of the third screen when the first software program is identical to the third software program, and to replace any one of the first display time and the third display time with the total time.

4. The information generation apparatus according to claim 3, wherein the processing circuitry does not replace any one of the first display time and the third display time with the total time when a standby screen for receiving a user's operation is displayed during a period of time from a timing when the first screen is displayed to a timing when the second screen is displayed.

5. The information generation apparatus according to claim 1, wherein the processing circuitry is configured to determine a screen of a type corresponding to, from among the first statistic values, a first statistic value exceeding a threshold, as a screen of a type on which the user is concentrating.

6. The information generation apparatus according to claim 1, wherein
the processing circuitry is configured to specify, for each of the different types of screens, one or more unit periods including a time when each type of screen is displayed, and to calculate a third statistic value based on a number of types of software programs started up in each of the specified unit periods to generate third statistic values corresponding to the different types of screens, and determine, for each type of the screens, whether the user is concentrating on a screen of each type, based on a corresponding first statistic value and third statistic value.

7. The information generation apparatus according to claim 1, wherein the processing circuitry is configured to specify, for each of the different types of screens, one or more unit periods including a time when each type of screen is displayed, and to calculate a fourth statistic value based on a number of operations by the user in each of the specified unit periods to generate fourth statistic values corresponding to the different types of screens, and determine, for each type of the screens, whether the user is concentrating on a screen of each type, based on a corresponding first statistic value and fourth statistic value.

8. A control system comprising:

an information generation apparatus, and information processing apparatuses each including a display and configured to communicate with the information generation apparatus, wherein the information generation apparatus comprises:

first processing circuitry configured to:

calculate, for each of different types of screens displayed on the display, a first statistic value of display time of a screen of each type displayed on the display, to generate first statistic values corresponding to the different types of screens;

determine, for each of the different types of screens, whether a user is concentrating on the screen, based on the first statistic value calculated for the screen; and generate a list indicative of screen identification information for identifying a type of screen for which a corresponding determination result is affirmative, wherein the information processing apparatuses each comprise:

second processing circuitry configured to:

acquire the list from the information generation apparatus;

determine not to provide the user with assistance information for assisting the user in an operation in response to the list indicating screen identification information indicative of a type of screen displayed on the display, and determine to provide the user with the assistance information in accordance with a status of the operation in response to the list not indicating the screen identification information indicative of the type of screen displayed on the display; and cause the display to display an image based on the assistance information in response to the second processing circuitry determining to provide the user with the assistance information.

9. The control system according to claim 8, wherein the first processing circuitry of the information processing apparatuses are each further configured to:

calculate, for each of the different types of screens displayed on the display, a fifth statistic value of display time of a screen of each type displayed on the display when a predetermined period of time elapses from a time when the display displays a screen, to generate fifth statistic values corresponding to the different types of screens;

determine, for each type of the screen, whether the user is concentrating on a screen of each type, based on, from among the fifth statistic values, a fifth statistic value calculated for the screen of each type; and generate an update list including screen identification information for identifying, from among the different types of screens, a type of screen type for which a corresponding determination result is affirmative.

10. The control system according to claim 9, the first processing circuitry of the information processing apparatuses are each further configured to:

calculate, for each of different software programs managing a screen displayed on the display, a sixth statistic value of display time of a screen displayed on the display when the predetermined period of time elapses from a time when the display displays a screen, to generate sixth statistic values corresponding to the different software programs;

determine, for each of the different software programs, whether the user is concentrating on a screen corresponding to each software program, based on, from among the sixth statistic values, a sixth statistic value calculated for each software program; and add, to the update list, software identification information for identifying, from among the software programs, a software program for which a corresponding determination result is affirmative.

* * * * *

UNITED STATES PATENT AND TRADEMARK OFFICE
CERTIFICATE OF CORRECTION

| | | |
|---|---|---|
| PATENT NO. | : 11,797,321 B2 | |
| APPLICATION NO. | : 17/437962 | |
| DATED | : October 24, 2023 | |
| INVENTOR(S) | : Keiichi Ochiai et al. | |

It is certified that error appears in the above-identified patent and that said Letters Patent is hereby corrected as shown below:

In the Claims

In Claim 1, Column 26, Line 17, please delete the language "from the first determiner".

In Claim 2, Column 26, Line 38, please delete the language "from the second determiner".

Signed and Sealed this
Twelfth Day of March, 2024

Katherine Kelly Vidal
*Director of the United States Patent and Trademark Office*